(12) United States Patent
Okizuka et al.

(10) Patent No.: US 11,455,636 B2
(45) Date of Patent: Sep. 27, 2022

(54) TRANSACTION MANAGEMENT SYSTEM AND TRANSACTION MANAGEMENT METHOD

(71) Applicant: Glory Ltd., Himeji (JP)

(72) Inventors: Hiromichi Okizuka, Himeji (JP); Minoru Higashiyama, Himeji (JP); Masayuki Akagi, Himeji (JP); Junichi Takemura, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 16/961,257

(22) PCT Filed: Jan. 11, 2019

(86) PCT No.: PCT/JP2019/000696
§ 371 (c)(1),
(2) Date: Jul. 10, 2020

(87) PCT Pub. No.: WO2019/139124
PCT Pub. Date: Jul. 18, 2019

(65) Prior Publication Data
US 2021/0065197 A1 Mar. 4, 2021

(30) Foreign Application Priority Data
Jan. 12, 2018 (JP) .............................. JP2018-003445

(51) Int. Cl.
*G06Q 10/02* (2012.01)
*G06Q 20/08* (2012.01)
(Continued)

(52) U.S. Cl.
CPC ....... *G06Q 20/40155* (2020.05); *G06Q 10/02* (2013.01); *G06Q 20/407* (2013.01); *G06Q 40/02* (2013.01)

(58) Field of Classification Search
CPC ............... G06Q 40/02; G06Q 30/0238; G06Q 30/0208; G07D 11/00; G07F 19/202; G07G 1/12
See application file for complete search history.

(56) References Cited

U.S. PATENT DOCUMENTS 7,131,580 B2 * 11/2006 Molbak .................. G07D 9/008
235/379
9,911,120 B2 * 3/2018 Laracey ............. G06Q 20/1085
(Continued)

FOREIGN PATENT DOCUMENTS

| JP | 2002-288506 A | 10/2002 |
| JP | 2005-025662 A | 1/2005 |

(Continued)

OTHER PUBLICATIONS

International Search Report and Written Opinion dated Apr. 10, 2019 for PCT/JP2019/000696 filed on Jan. 11, 2019, 11 pages including English Translation of the International Search Report.
(Continued)

*Primary Examiner* — Clifford B Madamba
(74) *Attorney, Agent, or Firm* — Xsensus LLP

(57) ABSTRACT

In order to manage a transaction that is performed to resolve a shortage of money in a store, a management server included in a transaction management system is provided with: a message release unit configured to release a message on a network, the message including information on a request for a transaction in which depositing of money or money change is to be performed, and on a benefit that is associated with the transaction and is given on condition that the transaction is completed; a transaction management unit configured to manage reservations for the transaction that have been reserved via the network, receive information on completion of the transaction via the network, and give the benefit via the network when a reserved transaction has been (Continued)

completed; and a memory configured to store and manage information on the transaction and the benefit.

15 Claims, 18 Drawing Sheets

(51) Int. Cl.
  *G06Q 20/10* (2012.01)
  *G06Q 20/40* (2012.01)
  *G06Q 40/02* (2012.01)

(56) References Cited

U.S. PATENT DOCUMENTS

| | | |
|---|---|---|
| 2003/0233276 A1 | 12/2003 | Pearlman et al. |
| 2008/0262928 A1 | 10/2008 | Michaelis |
| 2011/0238476 A1* | 9/2011 | Carr .................. G06Q 30/00 705/14.1 |
| 2013/0204688 A1* | 8/2013 | Yahn .................. G06Q 30/02 705/14.27 |
| 2017/0148002 A1 | 5/2017 | Stock et al. |

FOREIGN PATENT DOCUMENTS

| | | |
|---|---|---|
| JP | 2010-198266 A | 9/2010 |
| JP | 2012-137982 A | 7/2012 |
| JP | 5640735 B2 | 12/2014 |
| JP | 2017-126124 A | 7/2017 |
| WO | 2016/098219 A1 | 6/2016 |
| WO | 2017/122388 A1 | 7/2017 |
| WO | 2017/203577 A1 | 11/2017 |

OTHER PUBLICATIONS

Extended European Search Report dated Aug. 6, 2021 in European Application No. 19738739.2.

* cited by examiner

FIG.4

| CATEGORY | | | COMPANY | | | | STORE | | | | COMMODITY | | | | | |
|---|---|---|---|---|---|---|---|---|---|---|---|---|---|---|---|---|
| ID | NAME | ... | ID | NAME | LOGO | ... | ID | NAME | LOCATION INFORMATION | ... | ID | NAME | IMAGE | SELLING PRICE | COST PRICE | ... |
| 001 | SUPER-MARKET | ... | 001 | SUPER A | A SUPERMARKET | ... | 001 | B-STATION SQUARE STORE | 51.:...
0.:... | ... | 001 | WINE ... | (wine bottle) | £ 6.5 | £ 4.0 | ... |
| | | | | | | | | | | | 002 | PASTA ... | (pasta) | £ 2.0 | £ 1.0 | |
| | | | | | | | | | | | 003 | JAM ... | (jam jar) | £ 2.5 | £ 1.2 | |

FIG.5

| TRANS-ACTION ID | STATUS | COMPANY ID | STORE ID | DEPOSITING CONTENT ||| COM-MODITY ID | BENEFIT | NUMBER OF COUPONS REMAINING/TOTAL | RESER-VATION ACCEP-TANCE PERIOD | RESER-VATION ACCEP-TANCE EXPIRATION DATE/TIME | RESER-VATION VALIDITY PERIOD | COUPON USABLE PERIOD |
|---|---|---|---|---|---|---|---|---|---|---|---|---|---|
| | | | | CUR-RENCY | DENOMI-NATION | NUM-BER | | | | | | | |
| 0003 | OPEN FOR RES-ERVATIONS | 001 | 001 | UK-£ | p10 | 50 | 001 | £1.0 CASH REBATE | 7/10 | 5 HOURS | 2018/01/14 18:04 | 1 HOUR | 1 WEEK |
| 0002 | OPEN FOR RES-ERVATIONS | 001 | 001 | UK-£ | p5 | 20 | 003 | 50% DIS-COUNT | 3/15 | 3 HOURS | 2018/01/14 15:15 | 1 HOUR | 3 DAYS |
| 0001 | OPEN FOR RES-ERVATIONS | 001 | 001 | UK-£ | p2 | 50 | 002 | £1.0 CASH REBATE | 10/10 | 5 HOURS | 2018/01/14 17:44 | 1 HOUR | 2 HOURS |
| ... | | | | | | | | ... | | | | | ... |

FIG.6

| COUPON ID | STATUS | RESERVATION TERMINAL ID | COUPON RESERVATION DATE/TIME | RESERVATION EXPIRATION DATE/TIME | COUPON ISSUANCE DATE/TIME | COUPON EXPIRATION DATE/TIME | COUPON USE DATE/TIME |
|---|---|---|---|---|---|---|---|
| 0003-3 | RESERVED | 35··· | 2018/01/14 14:26 | 2018/01/14 15:26 | — | — | — |
| 0003-2 | ISSUED | 35··· | 2018/01/14 13:43 | 2018/01/14 14:43 | 2018/01/14 14:27 | 2018/01/21 | — |
| 0003-1 | ALREADY USED | 35··· | 2018/01/14 13:34 | 2018/01/14 14:34 | 2018/01/14 13:50 | 2018/01/21 | 2018/01/14 14:31 |
| ... | | | | | | | |

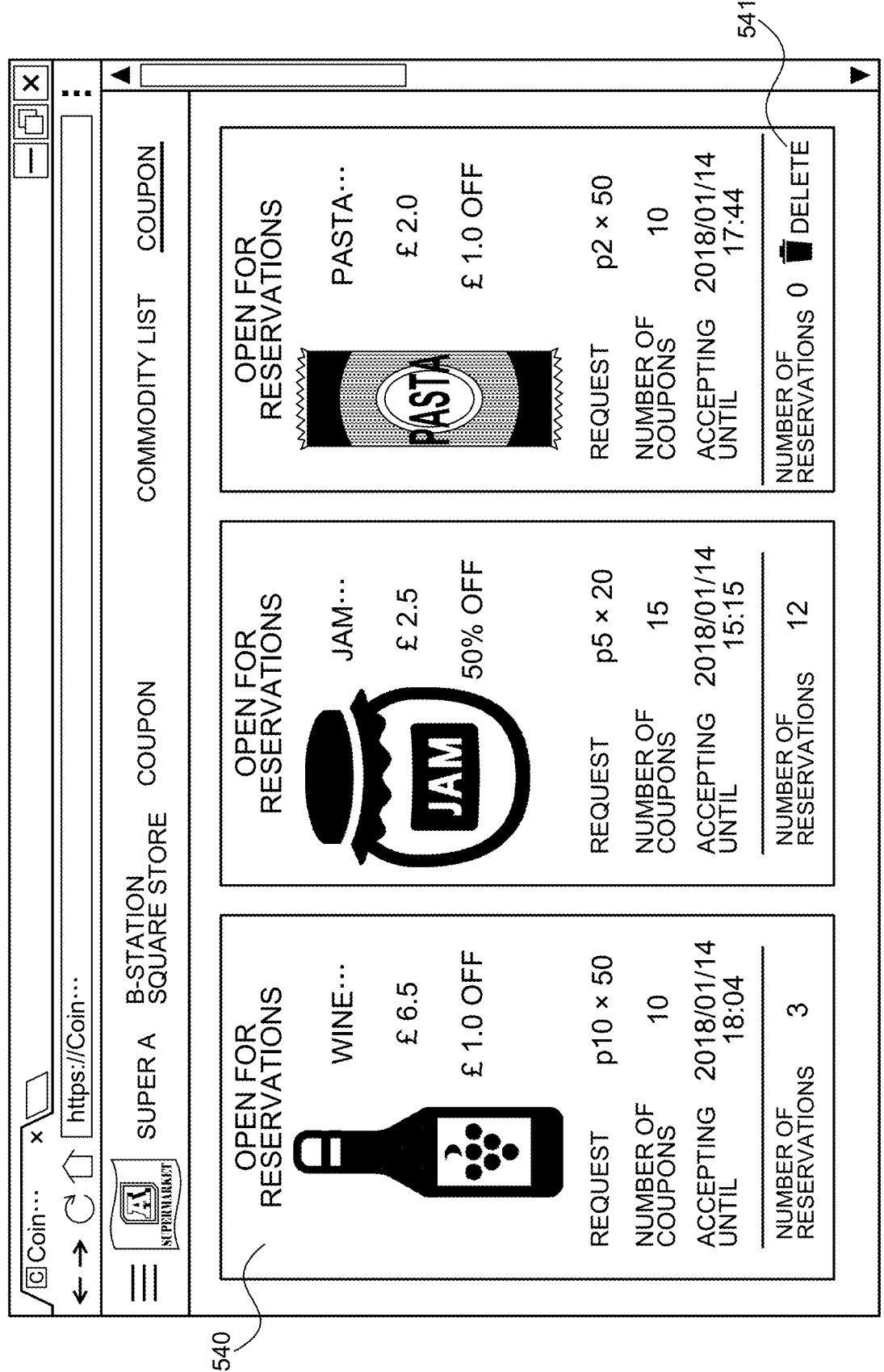

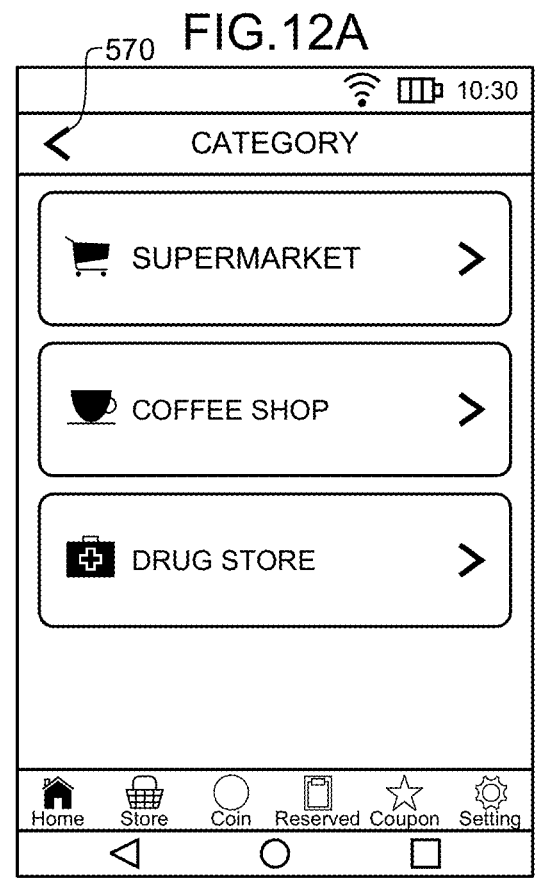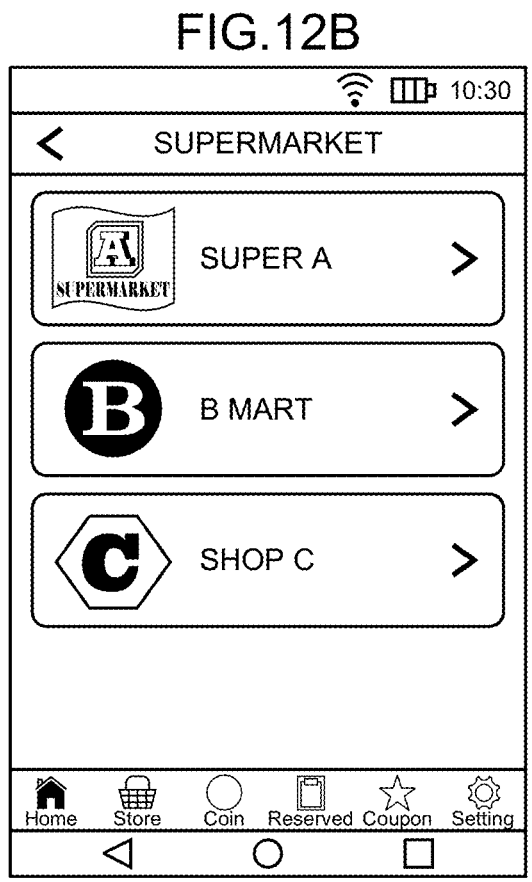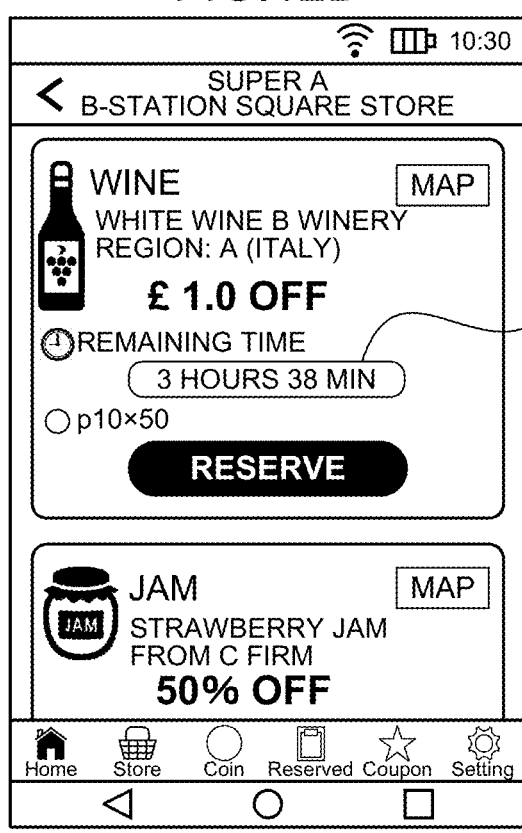

610

TRANSACTION MANAGEMENT SYSTEM AND TRANSACTION MANAGEMENT METHOD

CROSS-REFERENCE TO RELATED APPLICATIONS

The present application is based on PCT filing PCT/JP2019/000696, filed Jan. 11, 2019, which claims priority to JP 2018-003445, filed Jan. 12, 2018, the entire contents of each are incorporated herein by reference.

TECHNICAL FIELD

The present invention relates to a transaction management system and a transaction management method for managing transactions relating to a shortage of money in stores.

BACKGROUND ART

Conventionally, money handling apparatuses for depositing and dispensing money have been used in various stores of financial facilities, commercial facilities, and the like. Even in a case where money deposited in a money handling apparatus can be used for dispensing, a shortage of money for dispensing sometimes occurs. On the other hand, there is a case where a money storage unit used for storing money for dispensing is full-up with the money and additional money cannot be stored therein. Patent Literature 1 discloses a system for monitoring excess and shortage of money in a money handling apparatus. In this system, when a shortage of money occurs, a notification, which promotes users of the money handling apparatus to execute depositing of money, is transmitted to cellular phones possessed by the users.

CITATION LIST

Patent Literature

[PTL 1] Japanese Patent No. 5640735

SUMMARY OF THE INVENTION

Problems to be Solved by the Invention

In the aforementioned conventional art, however, the system cannot sufficiently deal with a shortage of money in stores. For example, since the system cannot grasp, in advance, the number of users who will execute depositing of money, the amount of money to be deposited cannot be expected in advance.

An object of the present invention is to provide a transaction management system and a transaction management method for managing transactions in order to resolve a shortage of money.

Solution to the Problems

A transaction management system according to a first aspect of the present invention includes a management server including: a message release unit configured to release a message on a network, the message including information on a request for a transaction in which depositing of money or money change is to be performed, and on a benefit that is associated with the transaction and is to be given on condition that the transaction is completed; a transaction management unit configured to manage reservations for the transaction that have been reserved via the network, receive information on completion of the transaction via the network, and give the benefit via the network when a reserved transaction has been completed; and a memory configured to store and manage information on the transaction and the benefit.

According to a second aspect of the present invention, in the transaction management system according to the first aspect, the transaction management unit manages a transaction that can be reserved via the network, as a transaction being open for reservations. When the transaction being open for reservations has been reserved via the network, the transaction management unit manages the transaction having been reserved, as a reserved transaction. When it is confirmed that the reserved transaction has been completed, based on the information on completion of the transaction received via the network, the transaction management unit manages the benefit associated with the reserved transaction as an already-given benefit.

According to a third aspect of the present invention, in the transaction management system according to the first or second aspect, the transaction management unit sets transaction identification information for the reserved transaction in order to manage information on each reserved transaction, and the information on completion of the transaction includes the transaction identification information.

According to a fourth aspect of the present invention, in the transaction management system according to the third aspect, the management server encodes the transaction identification information into an optical code to transmit via the network.

According to a fifth aspect of the present invention, in the transaction management system according to any one of the first to third aspects, the message includes information on designation of a denomination and quantity of money requested in the transaction, and an upper limit is set for an acceptable number of reservations for the transaction.

According to a sixth aspect of the present invention, in the transaction management system according to any one of the first to fifth aspects, a time limit within which reservations for the transaction are acceptable is set.

According to a seventh aspect of the present invention, in the transaction management system according to the sixth aspect, the transaction management unit manages the time limit, and the message release unit releases the message including information that the time limit is close, at a predetermined timing before the time limit.

According to an eighth aspect of the present invention, in the transaction management system according to any one of the first to seventh aspects, a time limit within which the benefit is usable is set.

According to a ninth aspect of the present invention, in the transaction management system according to any one of the first to eighth aspects, the message release unit releases the message to be displayed on a mobile terminal, and the transaction is reserved by using the mobile terminal.

According to a tenth aspect of the present invention, in the transaction management system according to the ninth aspect, the management server manages a plurality of benefits, and a denomination and quantity of money requested in a transaction associated with each benefit. When an operation to select conditions of a denomination and quantity of money is performed on the mobile terminal, the management server displays, on a screen of the mobile terminal, a benefit for which the denomination and quantity of money requested in the transaction satisfy the selected conditions.

According to an eleventh aspect of the present invention, in the transaction management system according to the ninth or tenth aspect, the benefit is set to be used in a specific store. The management server manages benefits of a plurality of different stores, companies to which the respective stores belong, and categories into which the respective companies are classified. When an operation to select a category is performed on the mobile terminal, the management server displays the companies classified into the selected category on a screen of the mobile terminal. When an operation to select a company is performed on the mobile terminal, the management server displays the stores that belong to the selected company on the screen of the mobile terminal. When an operation to select a store is performed on the mobile terminal, the management server displays a benefit of the selected store on the screen of the mobile terminal.

According to a twelfth aspect of the present invention, in the transaction management system according to the eleventh aspect, the management server manages benefits of a plurality of different stores, and location information indicating locations of the respective stores. When an operation to display a map is performed on the mobile terminal, the management server displays the locations of the stores on the map. When an operation to select a store on the map is performed on the mobile terminal, the management server displays the benefit of the selected store.

According to a thirteenth aspect of the present invention, in the transaction management system according to the twelfth aspect, when an operation to select conditions of a denomination and quantity of money is performed on the mobile terminal, the management server displays only the location of a store, for which the denomination and quantity of money requested in the transaction satisfy the selected conditions, on the map among the plurality of stores that have been displayed on the map.

According to a fourteenth aspect of the present invention, in the transaction management system according to any one of the ninth to thirteenth aspects, the management server transmits, to the mobile terminal, benefit identification information set on the benefit to be given. Upon receiving the benefit identification information from a settlement apparatus for using the benefit, the management server transmits information on the benefit to the settlement apparatus.

According to a fifteenth aspect of the present invention, the transaction management system according to any one of the first to fourteenth aspects further includes a money handling apparatus configured to perform the money depositing process or the money change to recognize and count deposited money, and transmit information on the deposited money to another device. The management server receives the information on completion of the transaction from the money handling apparatus via the network.

A transaction management method according to a sixteenth aspect of the present invention is a method performed by a transaction management system including a management server connected to a network. The method includes: releasing a message on a network by the management server, the message including information on a request for a transaction in which depositing of money or money change is to be performed, and on a benefit that is associated with the transaction and is to be given on condition that the transaction is completed; accepting, via the network, reservations for the transaction released by the management server; managing by the management server the transaction that has been reserved, as a reserved transaction; and receiving information on completion of the transaction via the network, and giving the benefit via the network when the reserved transaction has been completed, by the management server.

Advantageous Effects of the Invention

According to the present invention, it is possible to provide customers with an incentive to execute a transaction of depositing money into a money handling apparatus installed in a store. Specifically, a denomination, quantity, etc., of money, for which depositing of money or money change is requested to the customers, are set as a transaction content, and a benefit can be given to a customer who has completed this transaction. A shortage of money in the store can be resolved by managing the transaction content performed by customers in the store.

BRIEF DESCRIPTION OF THE DRAWINGS

FIG. 4 shows an example of store data managed by a memory of a management server shown in FIG. 3.

FIG. 5 shows an example of transaction data managed by the memory of the management server shown in FIG. 3.

FIG. 6 shows an example of coupon data managed by the memory of the management server shown in FIG. 3.

FIG. 9 shows an example of a screen on the store terminal on which coupons being open for reservations are listed.

FIGS. 12A to 12D show examples of a screen displayed on the mobile terminal when a store designation/search menu is selected.

DESCRIPTION OF EMBODIMENTS

Hereinafter, an embodiment of the present invention will be described with reference to accompanying drawings.

Embodiment

Hereinafter, a transaction management system and a transaction management method according to one embodiment of the present invention will be described. The transaction management system of the present embodiment enables a store to create a transaction content while designating a denomination, quantity, etc., of money that the store requires, and to release, on the internet, the transaction content and a benefit to be given to a customer who has performed money processing that satisfies the transaction content. The transaction management system is able to accept and manage reservations for the transaction, and to give the benefit to a customer who has performed the money processing that satisfies the transaction content. In addition, the transaction management system is able to set a time limit for accepting reservations for the transaction, and/or a time limit for giving the benefit to customers through execution of the reserved transactions.

The content of a depositing process or a money change process to be requested to customers can be designated as the transaction content. Commodities and/or services that are beneficial to customers may be used as the benefit, and examples of the benefit include: a coupon available for exchange or discount of a commodity; a commodity or a service provided free of charge; cash or a cash voucher; and points exchangeable for any of them. In the following description, a coupon is adopted as an example of the benefit. The "depositing process" described in this embodiment is a process in which money received from a customer is recognized, counted, and stored in a money handling apparatus from which a person in charge of a store can take out and use money. Meanwhile, the "money change process" is a process in which the depositing process is accepted and executed in the money handling apparatus, and money equal to the amount of the deposited money is dispensed in cash or the like of denomination different from that of the deposited money. In this embodiment, "money" includes at least one of "coin" and "banknote".

[Outline of System]

Figure 1:
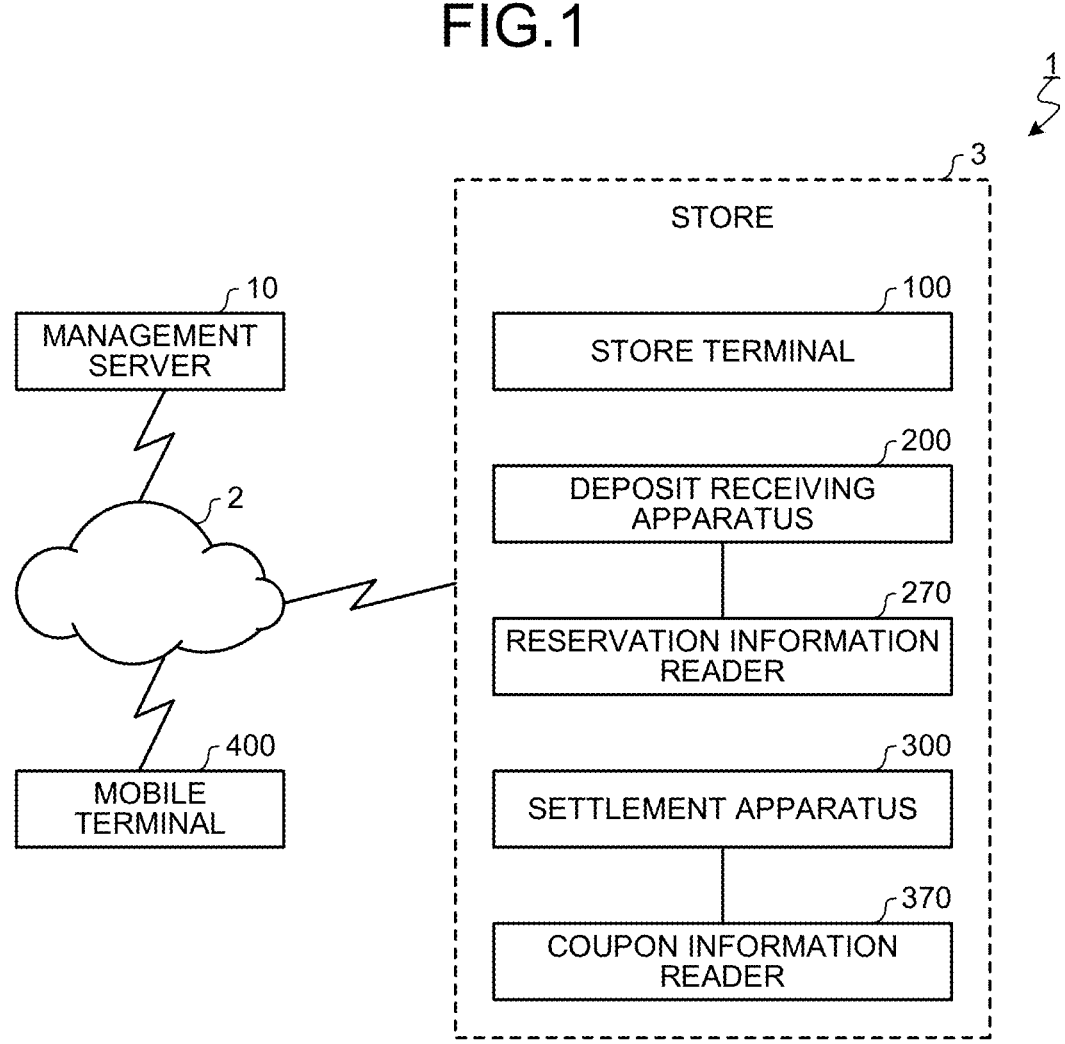
FIG. 1 is a schematic diagram showing an outline of a configuration of a transaction management system according to an embodiment of the present invention.

Outline of configuration and operation of a transaction management system will be described. FIG. 1 schematically shows an outline of a configuration of a transaction management system 1 according to the present embodiment. The transaction management system 1 includes a management server 10, a store terminal 100, a deposit receiving apparatus 200, a settlement apparatus 300, and a mobile terminal 400. The management server 10 is communicably connected to each of the store terminal 100, the deposit receiving apparatus 200, the settlement apparatus 300, and the mobile terminal 400 via the internet 2.

The management server 10 and the store terminal 100 consist of computers. The deposit receiving apparatus 200 is a money handling apparatus that receives depositing of money, recognizes and counts the deposited money, and stores the deposited money therein. A reservation information reader 270 is connected to the deposit receiving apparatus 200. The reservation information reader 270 reads an optical code, such as a one-dimensional code (barcode) or a two-dimensional code (QR code (registered trademark)), which has been generated by encoding information. The reservation information reader 270 decodes the information from the optical code. The settlement apparatus 300 is a money handling apparatus. When transaction, in which customers purchase a commodity/service of a store 3, the settlement apparatus 300 executes a depositing process for money received from a customer who pays for the commodity/service. The settlement apparatus 300 may also execute a dispensing process for dispensing money as change whose amount is calculated by subtracting the price/charge of the commodity/service from the amount of the deposited money. A coupon information reader 370, which reads an optical code such as a barcode or a QR code and decodes information from the optical code, is connected to the settlement apparatus 300. The mobile terminal 400 is a portable communication terminal accessible to the internet 2, such as a cellular phone or a tablet.

The store terminal 100, the deposit receiving apparatus 200, and the settlement apparatus 300 are installed in the store 3. Meanwhile, the management server 10 may be installed in any place and the mobile terminal 400 may be used in any place as long as they are accessible to the internet 2. Although one store 3 is shown in FIG. 1, a plurality of stores, such as stores of different companies, and different stores of the same company, use the transaction management system 1. In addition, many customers use the transaction management system 1 by operating their mobile terminals 400.

Figure 2:
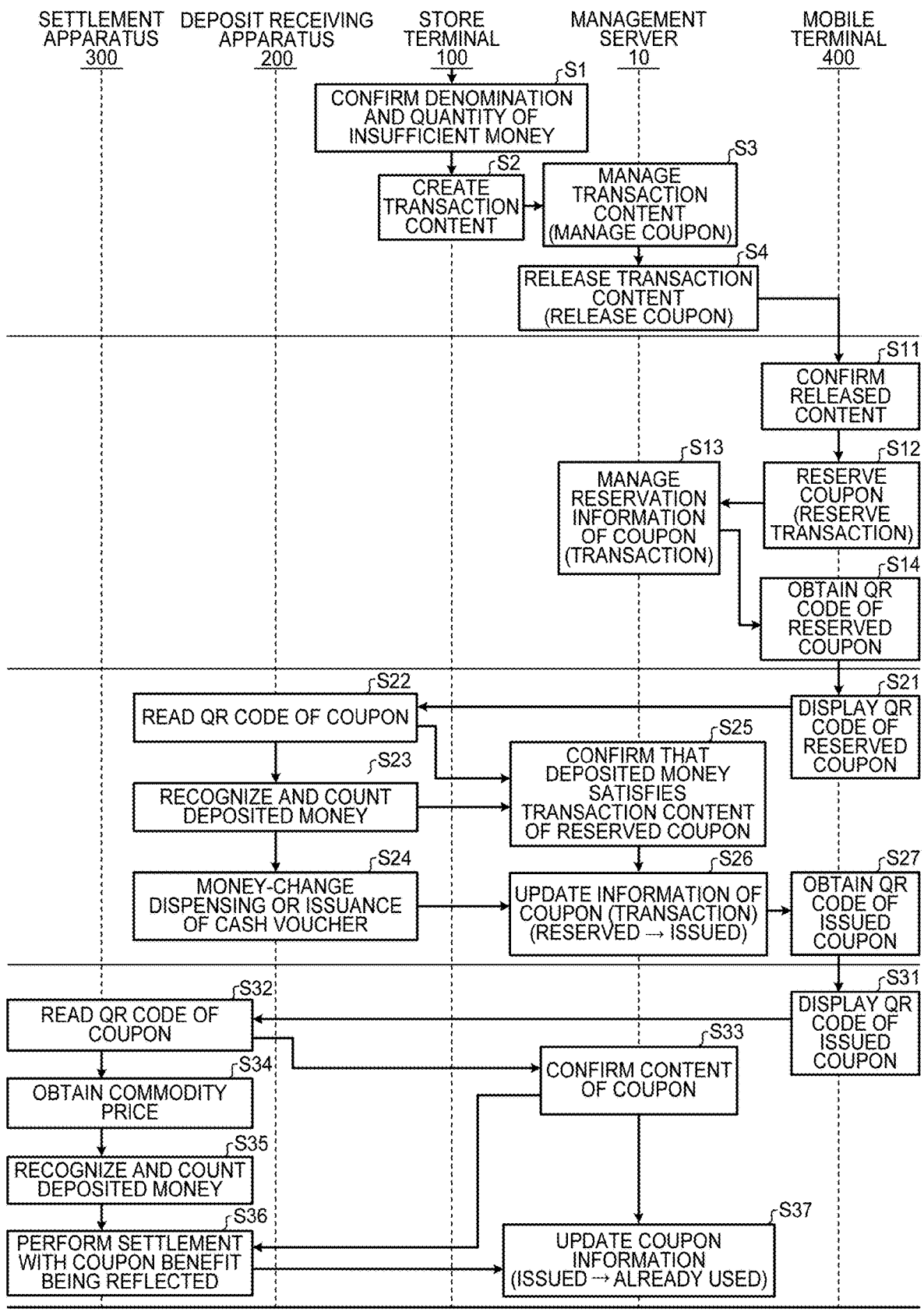
FIG. 2 is a flowchart showing process steps executed in the transaction management system shown in FIG. 1.

FIG. 2 is a flowchart showing process steps executed in the transaction management system 1. As viewed from a person in charge of the store 3, the process executed in the transaction management system 1 includes four stages: preparation and release of a transaction content (steps S1 to S4); reception of reservations for the released transaction (S11 to S14); reception of execution of a reserved transaction (S21 to S27); and reception of use of a coupon having been issued for a customer as a benefit for the executed transaction (S31 to S37). As viewed from a customer, the process performed in the transaction management system 1 include three stages: reservation for the released coupon (S11 to S14); acquisition of the reserved coupon (S21 to S27); and use of the acquired coupon (S31 to S37). In the transaction management system 1, a process related to the transaction content set by the person in charge of the store 3 corresponds to a process that the customer performs to acquire a coupon. For example, release of the transaction content prepared in the store 3 corresponds to release of a coupon to be reserved by the customer and a condition for issuance of the coupon. Reservation for the coupon by the customer corresponds to reservation for the transaction to be performed in the store 3. A money processing that the customer performs in the store 3 to acquire the reserved coupon corresponds to execution of the transaction for the store 3.

The flow of the process steps performed in the transaction management system 1 will be described with reference to FIG. 2. The store terminal 100 allows checking of the denominations and quantity (number) of money being stored in the money handling apparatuses installed in the store 3, such as the deposit receiving apparatus 200 and the settlement apparatus 300, as an inventory quantity of money in the store 3. A person in charge (hereinafter referred to as "clerk") who manages money in the store 3 operates the store terminal 100 to check the inventory quantity of money in the store 3 (step S1). If a shortage of money has occurred or is anticipated in the store 3, the clerk creates a transaction content to request for depositing of money into the deposit receiving apparatus 200 in the store 3 (step S2).

Specifically, the clerk operates the store terminal 100 to create the transaction content including: a depositing content designating a denomination and quantity of money; and content of a coupon to be issued as a benefit for a customer who has performed a depositing process that satisfies the depositing content. The clerk can set a time limit for accepting reservations for the transaction, a time limit for executing the reserved transaction, and the like. In other words, the clerk can set a time limit for accepting reservations for a coupon from customers, a time limit for acquiring the reserved coupon, and the like. The clerk can creates a transaction content by designating: a denomination and quantity of money, per transaction, for which depositing is requested; the number of transactions; a time limit for accepting reservations for the transactions; a time limit for issuing a coupon on condition that the reserved transaction is established; the content of the coupon to be provided as the benefit; and a time limit for using the coupon. The time limit may be a deadline or a remaining time period.

When a customer has performed a transaction and acquired a coupon as a benefit, the customer can receive a cash rebate, a percent discount, or the like for a commodity price or a service charge in the store 3, according to the content of the benefit. Since purchasing a commodity in the store 3 is similar to receiving a service in the store 3, purchase of a commodity will be taken as an example in the following description.

The management server 10 manages the transaction content created by the clerk (step S3). The management server 10 releases the transaction content on the internet (step S4). That is, the management server 10 manages the coupon of the store 3, and releases the coupon on the internet 2. The management server 10 releases a plurality of coupons created by one or a plurality of stores that use the transaction management system 1.

The customer operates the mobile terminal 400 to check the contents of the coupons released on the internet 2 by the management server 10 (step S11). The customer selects a coupon while considering the distance to the store 3 where he/she will perform the transaction, the content of the benefit offered by the coupon, and the like. The customer may select a coupon while considering, for example, the denomination and quantity of money that he/she possesses, and the denomination and quantity of money for which depositing is required in exchange for the coupon. The customer operates the mobile terminal 400 to make a reservation for the selected coupon (step S12). This reservation for the coupon corresponds to reservation for the transaction.

The management server 10 manages information of the coupon reserved by the customer, i.e., information of the reserved transaction (step S13). The customer who has reserved the coupon obtains, in the mobile terminal 400 from the management server 10, a QR code generated by encoding the information specifying the reserved coupon (step S14). Specifically, for example, when the mobile terminal 400 executes a dedicated application, a code generation unit operable in the terminal 400 is implemented. This code generation unit encodes the information obtained from the management server 10 into a QR code, and displays the QR code on a screen of the mobile terminal 400. The QR code allows specifying the transaction content managed by the management server 10, such as the depositing content including the denomination, quantity, etc., of money required in exchange for acquiring the reserved coupon.

The customer visits the store 3 and performs the depositing process within the time limit set for the reserved coupon (reserved transaction). Specifically, the customer causes the QR code of the reserved coupon obtained from the management server 10 to be displayed on the screen of the mobile terminal 400 (step S21). Then, the customer causes the reservation information reader 270 connected to the deposit receiving apparatus 200 to read the QR code on the screen (step S22), and deposits money into the deposit receiving apparatus 200. The deposit receiving apparatus 200 recognizes and counts the money deposited by the customer (step S23). The deposit receiving apparatus 200 dispenses money that is equal in amount to the money deposited by the customer but is different in denomination from the deposited money, or issues a cash voucher that is equal in amount to the deposited money and is available in the store 3, thereby completing the depositing process (step S24). As to which of dispensing with money change (i.e., dispensing money of denomination different from that of the deposited money) or issuance of a cash voucher should be executed, the store 3 may fix the deposit receiving apparatus 200 to perform one of them, or the user may be allowed to select one of them.

The deposit receiving apparatus 200 transmits, to the management server 10, the information obtained from the mobile terminal 400 by reading the QR code, and depositing information including the denomination and quantity of money deposited by the customer. Based on the information obtained from the QR code, the management server 10 specifies the coupon reserved by the customer. Then, the management server 10 confirms that the denomination and quantity of money deposited in the deposit receiving apparatus 200 satisfies the depositing content set as an issuance condition for the reserved coupon (step S25). The management server 10 performs determination as to whether or not the depositing content is satisfied, in other words, whether or not the reserved transaction has been established.

Upon completing the depositing process through the dispensing with money change or the issuance of a cash voucher, the deposit receiving apparatus 200 notifies the management server 10 of the completion. Upon confirming that the depositing process has been completed and has satisfied the transaction content set for the reserved coupon, the management server 10 issues the coupon reserved by the customer, and makes the coupon available in the store 3. Specifically, the management server 10 updates the state of the coupon from a reserved state to an issued state (step S26).

When the transaction in the store 3 has been finished and the reserved coupon has been issued, the customer who has acquired the coupon obtains, at the mobile terminal 400, a QR code including encoded information specifying the issued coupon (step S27). Specifically, for example, when the mobile terminal 400 executes a dedicated application, a code generation unit operable in the mobile terminal 400 is implemented. Then, this code generation unit encodes the information obtained from the management server 10 into the QR code, and displays the QR code on the screen of the mobile terminal 400. If the reserved transaction is not executed within the time limit set in advance, the reservation becomes invalid.

The customer uses the issued coupon in a transaction to purchase a commodity in the store 3. Specifically, the customer causes the QR code of the issued coupon obtained from the management server 10 to be displayed on the screen of the mobile terminal 400 (step S31). Then, the customer causes the coupon information reader 370 to read the QR code on the screen (step S32), and deposits money into the settlement apparatus 300 to pay for the price of the commodity. The settlement apparatus 300 transmits the information obtained from the mobile terminal 400 by reading the QR code, to the management server 10. Based on the information obtained from the QR code, the management server 10 confirms the content of the issued coupon acquired by the customer (step S33).

The settlement apparatus 300 obtains information of the commodity price (step S34). For example, the settlement apparatus 300 obtains the information of the commodity price from a cash register that calculates the total amount of prices of commodities that a customer purchases. In addition, the settlement apparatus 300 recognizes and counts the money that the customer has deposited to pay for the commodity (step S35).

The settlement apparatus 300 obtains, from the management server 10, the content of the benefit offered by the issued coupon to be used by the customer. The settlement apparatus 300 executes a settlement process, with a cash rebate or a percent discount offered by the issued coupon being reflected on the commodity price (step S36). For example, when the issued coupon is used to purchase a commodity designated by this coupon, the cash rebate is applied to the price of the commodity. When the total amount of money deposited by the customer for purchasing the commodity exceeds the discounted commodity price after the cash rebate, the settlement apparatus 300 executes a dispensing process for returning change, whose amount corresponds to the difference between the deposited amount and the discounted commodity price, to the customer, thereby completing the settlement process. A time limit is set for use of the issued coupon. When the time limit expires, the coupon becomes invalid, and the customer becomes unable to acquire the benefit of the coupon.

Upon completing the settlement process, the settlement apparatus 300 notifies the management server 10 of the completion. Upon receiving the notification, the management server 10 makes the issued coupon, which has already been used by the customer, not reusable. Specifically, the management server 10 updates the state of the coupon from the issued state to the already-used state (step S37).

The QR code exchanged in steps S13 to S25 is transaction identification information for recognizing the reserved transaction, and is also coupon recognition information for recognizing the reserved coupon. This QR code is used for specifying the depositing content that is set as a condition for establishing the reserved transaction, i.e., a condition for issuing the reserved coupon. Meanwhile, the QR code exchanged in steps S26 to S33 is benefit identification information for recognizing the content of the benefit of the coupon issued for the customer after establishing the transaction, and is also coupon recognition information for recognizing the issued coupon. This QR code is used for specifying the content of the benefit given by establishing the transaction, i.e., the content of the benefit obtained by the issued coupon.

As described above, the clerk can create the transaction content by designating a denomination and quantity of money to be deposited in the deposit receiving apparatus 200 in the store 3, the coupon to be issued as a benefit for customers, and the like, and can release the transaction content on the internet 2. In addition, the clerk can designate the number of customers who performs the transaction, i.e., the number of coupons to be issued. This allows the deposit receiving apparatus 200 in the store 3 to receive depositing of money of the denomination and quantity required in the store 3. In addition, the clerk can set a time limit for accepting reservations for the transaction, and a time limit for executing the reserved transaction. That is, the clerk can set a time limit for accepting reservations for the coupon, and a time limit for executing the depositing process after the reservation of the coupon. Therefore, for example, when the transaction has not been reserved or when the reserved transaction has not been executed, the clerk can take a countermeasure such as creating a new transaction content. That is, the clerk can take a countermeasure such as issuing a new coupon according to the coupon reservation status or the depositing execution status.

The customer can select and reserve a coupon from among a plurality of coupons released on the internet 2. That is, the customer can select and reserve a desired transaction content upon checking the transaction contents created by the store 3. Specifically, the customer can select a coupon from among a plurality of coupons of the same store, and can select a coupon from among a plurality of coupons of different stores. Thus, the customer can select a coupon according to the denomination and quantity of money that he/she possesses, the content of the benefit offered by the coupon, and the like. In addition, the customer can select a store that he/she can visit to perform the depositing process, from among a plurality of stores releasing coupons.

[Configuration of Transaction Management System]

Figure 3:
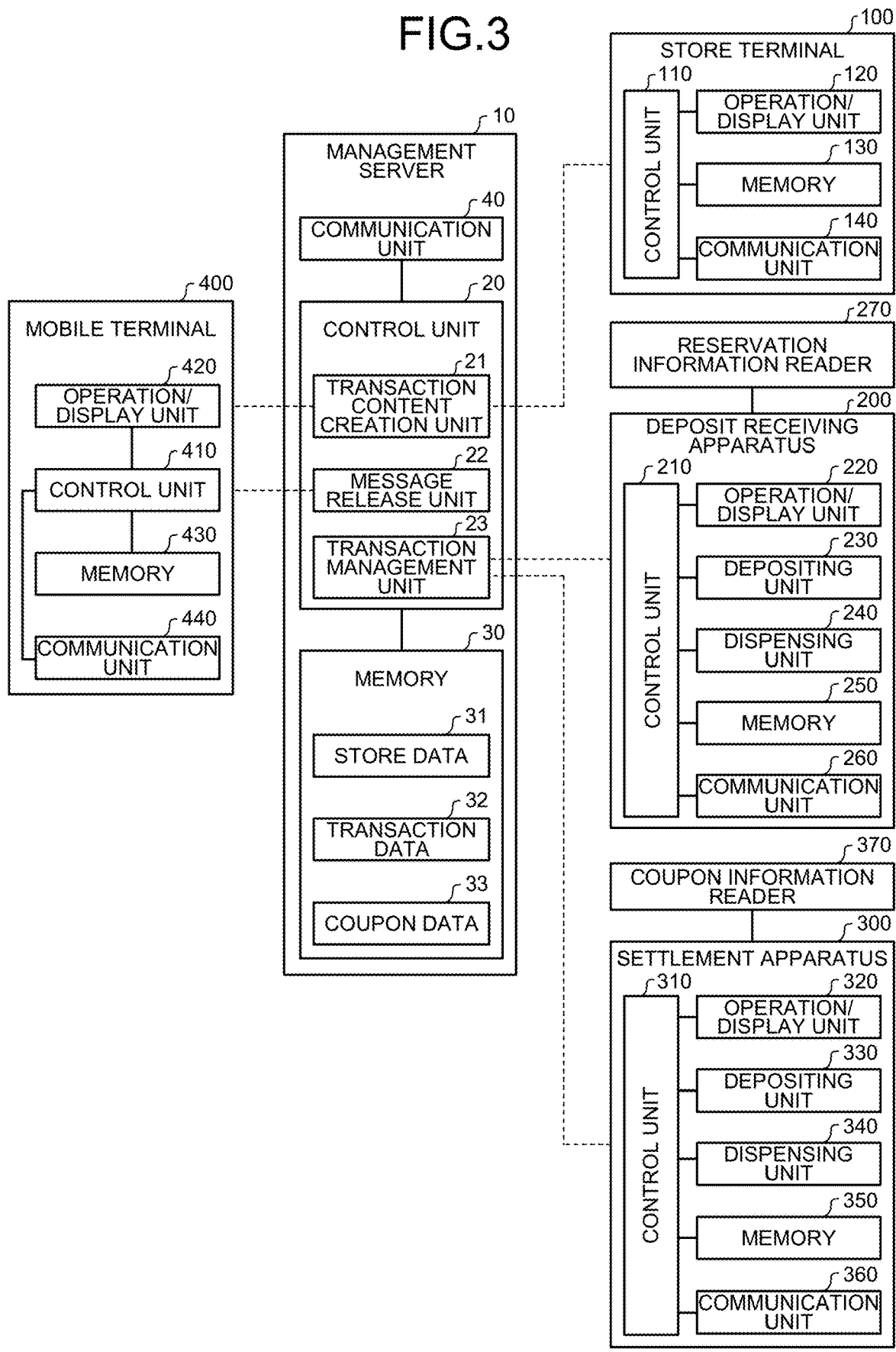
FIG. 3 is a block diagram schematically showing configurations of apparatuses constituting the transaction management system shown in FIG. 1.

Schematic configurations of the respective apparatuses constituting the transaction management system 1 will be described with reference to a block diagram shown in FIG. 3. In FIG. 3, broken lines indicate data transmission/reception performed between the apparatuses through the internet 2. FIG. 3 shows the components necessary for describing transaction management.

[Store Terminal 100]

The store terminal 100 consists of a computer including a control unit 110, an operation/display unit 120, a memory 130, and a communication unit 140. The operation/display unit 120 functions as an operation unit through which various kinds of information are inputted. Also, the operation/display unit 120 functions as a display unit that outputs and displays various kinds of information on a screen. For example, a touch panel type liquid crystal display device is used as the operation/display unit 120. The clerk of the store 3 operates the operation/display unit 120 of the store terminal 100 to input information regarding settings, instructions, etc., while checking the various kinds of information displayed on the screen. The memory 130 is a nonvolatile storage device such as a semiconductor memory, a hard disk, or the like. The memory 130 is used for storing data necessary for implementing the functions and operations of the store terminal 100. The communication unit 140 has a function of communicating with external devices wirelessly or via wires. The communication unit 140 exchanges data with external devices via the internet 2. The control unit 110 implements the functions and operations of the store terminal 100 described in the present embodiment by using data in the memory 130, based on the content of operation performed on the operation/display unit 120, the content of communication performed with the management server 10, and the like.

[Mobile Terminal 400]

The mobile terminal 400 is a portable communication terminal including a control unit 410, an operation/display unit 420, a memory 430, and a communication unit 440. For example, a cellular phone, a tablet, or the like is used as the mobile terminal 400. The operation/display unit 420 is, for example, a touch panel type liquid crystal display device. The operation/display unit 420 functions as an operation unit through which various kinds of information are inputted. Also, the operation/display unit 420 functions as a display unit that outputs and displays various kinds of information on a screen. The customer operates the operation/display unit 420 of the mobile terminal 400 to input information regarding a coupon for reservation, acquisition, use, etc., while checking the various kinds of information displayed on the screen. The memory 430 is a nonvolatile storage device such as a semiconductor memory. The memory 430 is used for storing data necessary for implementing the functions and operations of the mobile terminal 400. The communication unit 440 has a function of wirelessly communicating with external devices. The communication unit 440 exchanges data with external devices via the internet 2. The control unit 410 implements the functions and operations of the mobile terminal 400 described in the present embodiment by using data in the memory 430, based on the content of operation performed on the operation/display unit 420, the content of communication performed with the management server 10, and the like.

Although not shown in FIG. 3, the mobile terminal 400 has a function of recognizing the current position by using GPS (Global Positioning System). The mobile terminal 400 displays a map on the screen of the operation/display unit 420, and points out the current position on the screen. The mobile terminal 400 further has a function of searching for a route from the current position to the store 3, and calculating a distance to the store 3 and a time required for reaching the store 3. The mobile terminal 400 further has a function of obtaining identification information for identifying each transaction content and/or identification information for identifying each coupon, and encoding the obtained information into a QR code to be displayed on the screen.

[Deposit Receiving Apparatus 200]

The deposit receiving apparatus 200 is a money handling apparatus including a control unit 210, an operation/display unit 220, a depositing unit 230, a dispensing unit 240, a memory 250, and a communication unit 260. The deposit receiving apparatus 200 accepts and performs a depositing process that enables a customer to acquire his/her reserved coupon. That is, deposit receiving apparatus 200 accepts and performs a transaction reserved by the customer. The deposit receiving apparatus 200 has a function of executing a dispensing process (money change process) of dispensing money that is equal in amount to the money deposited by the customer but is different in denomination from the deposited money. The deposit receiving apparatus 200 further has a function of executing issuance of a cash voucher that is equal in amount to the money deposited by the customer and is available in the store 3.

The operation/display unit 220 is, for example, a touch panel type liquid crystal display device. The operation/display unit 220 functions as an operation unit through which various kinds of information are inputted. Also, the operation/display unit 220 functions as a display unit that outputs and displays various kinds of information on a screen. The customer operates the operation/display unit 220 to start a transaction regarding a coupon that he/she has reserved from the mobile terminal 400. The memory 250 is a nonvolatile storage device such as a semiconductor memory. The memory 250 is used for storing data necessary for implementing the functions and operations of the deposit receiving apparatus 200. The communication unit 260 has a function of communicating with external devices wirelessly or via wires. The communication unit 260 exchanges data with external devices via the internet 2. The control unit 210 implements the functions and operations of the deposit receiving apparatus 200 described in the present embodiment by using data in the memory 250, based on the content of operation performed on the operation/display unit 220, the content of communication performed with the management server 10, and the like.

The reservation information reader 270 is connected to the deposit receiving apparatus 200. For example, the reservation information reader 270 is a camera or a scanner for optically reading information. The deposit receiving apparatus 200 uses the reservation information reader 270 to read a QR code of a reserved coupon displayed on the operation/display unit 420 of the mobile terminal 400. The deposit receiving apparatus 200 transmits information obtained by reading the QR code, to the management server 10.

The depositing unit 230 takes money, received in an inlet from the customer, into the apparatus 200. The depositing unit 230 performs a depositing process of recognizing and counting the money by using a recognition/counting unit, and storing the money for each denomination in a plurality of storage units disposed in the apparatus 200. Information indicating the denomination and quantity of the money deposited by the customer is transmitted to the management server 10.

The dispensing unit 240 performs a dispensing process (money change process) of discharging, to an outlet, money whose amount is equal to the total amount of the money deposited by the customer and whose denominations are different from the denomination of the deposited money. The dispensing unit 240 determines a denomination and quantity of money equivalent to the total amount of the money deposited by the customer. The dispensing unit 240 feeds out money of the determined denomination by the determined quantity from among money being stored in the plurality of storage units, and discharges the money to the outlet. It is possible to store cash vouchers of different monetary amounts in the plurality of storage units. A cash voucher is a valuable medium that is treated equally as money in the store 3. The customer can use a cash voucher instead of money when paying for purchasing commodities in the store 3. By storing cash vouchers in the storage units of the deposit receiving apparatus 200, it is possible to discharge, to the outlet, cash vouchers that are combined such that a total amount of these cash vouchers is equal to the total amount of the money deposited by the customer. As to which of money and cash voucher should be discharged, the clerk may fix the dispensing unit 240 to discharge either of them. Alternatively, the dispensing unit 240 may be set to discharge money or cash voucher in response to customer's operation of selecting money or cash voucher.

[Settlement Apparatus 300]

The settlement apparatus 300 is a money handling apparatus including a control unit 310, an operation/display unit 320, a depositing unit 330, a dispensing unit 340, a memory 350, and a communication unit 360. In a transaction in which the customer purchases a commodity in the store 3, the settlement apparatus 300 executes a settlement process of receiving payment for the commodity. In the settlement process, the customer can use the acquired coupon to purchase the commodity at a discount price which has been calculated by applying to the commodity price a cash rebate or a percent discount offered by the coupon.

The operation/display unit 320 is, for example, a touch panel type liquid crystal display device The operation/display unit 320 functions as an operation unit through which various kinds of information are inputted. Also, the operation/display unit 320 functions as a display unit that outputs and displays various kinds of information on a screen. When the customer purchases a commodity in the store 3, the customer or the clerk can start a settlement process for the transaction of the commodity by operating the operation/display unit 320. The memory 350 is a nonvolatile storage device such as a semiconductor memory. The memory 350 is used for storing data necessary for implementing the functions and operations of the settlement apparatus 300. The communication unit 360 has a function of communicating with external devices wirelessly or via wires. The communication unit 360 exchanges data with external devices via the internet 2. The control unit 310 implements the functions and operations of the settlement apparatus 300 described in the present embodiment by using data in the memory 350, based on the content of operation performed on the operation/display unit 320, the content of communication performed with the management server 10, and the like.

The coupon information reader 370 is connected to the settlement apparatus 300. For example, the coupon information reader 370 is a camera or a scanner for optically reading information. The settlement apparatus 300 can use the coupon information reader 370 to read a QR code of an issued coupon displayed on the operation/display unit 420 of the mobile terminal 400. The settlement apparatus 300 transmits information obtained by reading the QR code to the management server 10, and receives information on the issued coupon from the management server 10. Based on the received information, the settlement apparatus 300 specifies a commodity to which the coupon is to be applied, and executes the settlement process, with a cash rebate or a percent discount being applied to the price of this commodity.

The depositing unit 330 takes money, received in an inlet from the customer, into the apparatus 300. The depositing unit 230 executes a depositing process of recognizing and counting the money by using a recognition/counting unit, and storing the money for each denomination in a plurality of storage units disposed in the apparatus 300.

The settlement apparatus 300 obtains information of the price of the commodity that the customer purchases. For example, the settlement apparatus 300 is connected to a cash register (not shown) such as a POS register. The settlement apparatus 300 obtains information on the commodity price calculated by the cash register. The settlement apparatus 300 applies a cash rebate or a percent discount offered by the coupon to the obtained commodity price, and calculates an actual price to be paid for the commodity by the customer. Then, the settlement apparatus 300 calculates an amount of change, based on the total amount of money deposited in the depositing unit 330 by the customer, and the price calculated by applying the coupon to the commodity price.

The dispensing unit 340 executes a change dispensing process according to need. Specifically, when the total amount of the money deposited in the depositing unit 330 by the customer exceeds the commodity price to be paid, the dispensing unit 340 regards this difference as an amount of change. Then, the dispensing unit 340 determines a denomination and quantity of money equivalent to the amount of change. The dispensing unit 340 feeds out money of the determined denomination by the determined quantity from among money being stored in the plurality of storage units in advance, and discharges the money into the outlet to return to the customer as change.

Upon completing the transaction using the coupon, the settlement apparatus 300 notifies the management server 10 of the completion. Upon receiving the notification, the management server 10 updates the status of the coupon from "issued" to "already-used".

[Management Server 10]

The management server 10 consists of a computer including a control unit 20, a memory 30, and a communication unit 40. The communication unit 40 has a function of communicating with external devices wirelessly or via wires. The communication unit 40 exchanges data with external devices via the internet 2. Processes regarding creation and reservation of transaction contents, issuance and use of coupons, and the like performed in the transaction management system 1, are implemented as a cloud service using the internet 2. The management server 10 functions as a cloud server that provides the cloud service. For example, the store terminal 100 and the mobile terminal 400 access the management server 10 by using a browser, and use the cloud service provided by the management server 10.

The memory 30 is a nonvolatile storage device such as a semiconductor memory. The memory 30 is used for storing data necessary for implementing the functions and operations of the management server 10. In the memory 30, store data 31, transaction data 32, and coupon data 33 are stored. The store data 31 includes information of stores, information on coupons issued by the stores in the past, and the like. The transaction data 32 includes information on transactions that are open for reservations on the Internet 2, i.e., information on coupons. The coupon data 33 includes information on coupons reserved by customers. Details and usage methods of these data will be described later.

The control unit 20 implements the functions and operations of the management server 10 described in the present embodiment by using data in the memory 30, based on, for example, the contents of communications performed with the store terminal 100, the deposit receiving apparatus 200, the settlement apparatus 300, and the mobile terminal 400. The control unit 20 includes a transaction content creation unit 21, a message release unit 22, and a transaction management unit 23.

Upon receiving an operation performed on the store terminal 100 by the clerk of the store 3, the transaction content creation unit 21 creates a transaction content including: a transaction of depositing money; and the content of a coupon to be issued as a benefit on condition that the transaction is completed. The transaction content creation unit 21 registers the created transaction content in the transaction data 32 in the memory 30. When creating a coupon, information of commodities for which coupons were issued in the past, which is stored in the store data 31, can be displayed on the operation/display unit 120 of the store terminal 100, and used to create the coupon. Details of this operation will be described later.

The message release unit 22 releases information of a transaction content registered in the transaction data 32 in the memory 30, on the internet 2 as a message to customers. Specifically, the message release unit 22 creates and releases a message including the content of a transaction including a depositing process or a money change process, and the content of a coupon to be given as a benefit on condition that the transaction is completed. Each customer is allowed to perform search for a coupon by designating a store, search for a coupon based on the denomination and quantity of money that he/she possesses, search for a coupon based on the current position, and the like. The message release unit 22 displays necessary information on the screen of the mobile terminal 400, in response to the content of operation performed on the operation/display unit 420 of the mobile terminal 400, to realize these searches, which will be described later in detail. When the customer has reserved a coupon from the mobile terminal 400, the message release unit 22 registers, in the coupon data 33 in the memory 30, information specifying the reserved coupon, information on the mobile terminal 400 used to reserve the coupon, and the like in association with each other.

The transaction management unit 23 manages reserved transactions registered in the coupon data 33 in the memory 30. That is, the transaction management unit 23 manages reserved coupons. The transaction management unit 23 updates information of the reserved transaction (reserved coupon) according to the processing status. For example, a customer performs the reserved transaction with the deposit receiving apparatus 200 in the store 3 to acquire the reserved coupon, and if the deposited money satisfies the transaction content set as an issuance condition for the reserved coupon, the transaction management unit 23 issues the reserved coupon. The transaction management unit 23 functions as a determination unit for determining whether or not the transaction is established. The transaction management unit 23 issues the coupon set as a benefit, on condition that the reserved transaction is completed. Specifically, the transaction management unit 23 updates the state of the coupon from the reserved state to the issued state. Thus, the customer becomes able to use the acquired coupon in the store 3. When the customer has used the issued coupon in the store 3, the transaction management unit 23 updates the state of the coupon from the issued state to the already-used state.

The transaction management unit 23 manages reservation expiration date and time of the reserved transaction (reserved coupon), and an issued-coupon expiration date and time of the issued coupon. The transaction management unit 23 sends the mobile terminal 400 notification that the expiration date and time is close, at a predetermined timing before the expiration date and time. For example, the notification is made at a predetermined timing such as 1 hour or 30 minutes before the expiration date and time.

[Data Managed by Management Server 10]

Data managed by the management server 10 will be described with reference to specific examples. Although currency to be managed by the transaction management system 1 is not particularly limited, the British currency, pound sterling (British pound), is used as an example.

[Store Data 31]

FIG. 4 shows an example of the store data 31 stored in the memory 30 of the management server 10. The store data 31 includes items "category", "company", "store", and "commodity". The item "category" is information indicating categorized companies, to which stores belong, such as "supermarket", "coffee shop", "drugstore", etc. The item "category" includes an ID (identification information) for identifying each category, and the name of each category.

The item "company" is information indicating companies that provide commodities and the like in stores. The item "company" includes an ID (identification information) for identifying each company, the name of each company, a logo of each company, etc. As the logo of each company, an image of a logotype, an image of a symbol mark, an image including both a logotype and a symbol mark, etc., is registered.

The item "store" is information indicating stores in which the corresponding companies provide customers with commodities and the like. The item "store" includes an ID (identification information) for identifying each store, the name of each store, location information of each store, etc. The location information includes a latitude and a longitude. Even when the same company has a plurality of stores, each store can be managed based on the information registered in the item "store".

The item "commodity" is information indicating commodities for which coupons can be issued. For example, information created in each store in the past is registered. The item "commodity" includes an ID (identification information) for identifying each commodity, and the name, image, selling price, cost price, etc., of each commodity. The clerk of each store can create a coupon, with the information of the commodities included in the store data 31 being displayed on the operation/display unit 120 of the store terminal 100, which will be described later in detail. Information of the coupon created on the store terminal 100 is registered in the transaction data 32.

[Transaction Data 32]

FIG. 5 shows an example of the transaction data 32 managed in the memory 30 of the management server 10. The transaction data 32 includes items such as "transaction ID", "status", "company ID", "store ID", "depositing content", "commodity ID", "benefit", "number of coupons", "reservation acceptance period", "reservation acceptance expiration date/time", "reservation validity period", and "coupon usable period".

The item "transaction ID" is identification information for managing each transaction content created in each store. The item "status" is information indicating the status of each transaction. The item "status" is "open for reservations" as shown in FIG. 5 while reservations for the transaction are being accepted. The "status" becomes "closed" when all coupons have been reserved or when the reservation acceptance period has expired. The items "company ID" and "store ID" correspond to the items "company ID" and "store ID" in the store data 31 shown in FIG. 4. A company and a store that have created a coupon registered in the transaction data 32 can be specified by referring to the store data 31, based on the company ID and the store ID registered in the transaction data 32.

The item "depositing content" shown in FIG. 5 is information indicating the content of a depositing process requested in the store as a coupon issuance condition. The item "depositing content" includes sub-items "currency", "denomination", and "number". For example, the depositing content of transaction ID "0001" shown in FIG. 5 indicates that depositing of fifty 2-pence coins (2 p) of the British pound sterling (UK-£) is requested in exchange for the corresponding coupon. If a customer performs the depositing process that satisfies this depositing content, the transaction is established, and the coupon is given to the customer as a benefit.

The item "commodity ID" shown in FIG. 5 corresponds to the item "commodity ID" in the store data 31 shown in FIG. 4. A commodity as the subject of a coupon registered in the transaction data 32 can be specified by referring to the store data 31, based on the commodity ID registered in the transaction data 32.

The item "benefit" shown in FIG. 5 is information indicating the content of a benefit to be issued as each coupon, such as a cash rebate or a percent discount applied to the corresponding commodity. The item "number of coupons" is information indicating the total number and the remaining number of coupons that are open for reservations. For example, "3/15", in the item "number of coupons" for the transaction ID "0002" shown in FIG. 5, indicates that the total number of coupons being open for reservations is 15, 12 coupons have already been reserved, and 3 coupons remain.

The item "reservation acceptance period" shown in FIG. 5 is information indicating a time period during which each transaction content, which has been created in a store and registered in the transaction data 32 as shown in FIG. 5, is open for reservations. The item "reservation acceptance expiration date and time" is information indicating date and time when acceptance of reservations for the created transaction expires. The item "reservation validity period" is information indicating a time period during which each transaction, for which reservation has been established, can be executed. The "reservation acceptance period" is a time period during which each coupon is open for reservations. The "reservation acceptance expiration date and time" is date and time when acceptance of reservations for the coupon expires. The "reservation validity period" is a time period during which a depositing process to acquire the reserved coupon is accepted. The item "coupon usable period" is information indicating a time period during which a customer, who has performed a depositing process to establish a transaction and has acquired the reserved coupon, can use this coupon.

For example, regarding the transaction content of the transaction ID "0001" shown in FIG. 5, this transaction is open for reservations until 17:44 on Jan. 14, 2018 that is 5 hours after the transaction content is registered into the transaction data 32 as shown in FIG. 5. No reservations are accepted after this date and time has expired. A customer has reserved this transaction, and if he/she performs the depositing process to establish the reserved transaction within 1 hour after the establishment of the reservation, the customer can acquire the reserved coupon. However, after this period (1 hour) has expired, the customer cannot acquire the reserved coupon even if he/she performs the depositing process. After the customer has acquired the coupon upon establishment of the reserved transaction, the customer can use the coupon within 2 hours from issuance of the coupon. After this period has expired, the coupon becomes invalid and the customer cannot use it anymore.

Based on the reservation validity period and the current date and time, the management server 10 notifies the mobile terminal 400 that the expiration date and time is close, at a predetermined time before the reservation validity period expires. Likewise, based on the coupon usable period and the current date and time, the management server 10 notifies the mobile terminal 400 that the expiration date and time is close, at a predetermined timing before the coupon usable period expires. The notification is performed by, for example, outputting a notification sound as well as displaying a message containing the notification content on the operation/display unit 420 of the mobile terminal 400. When, for example, the mobile terminal 400 includes a light-emitting unit such as an LED, the notification can be performed by lighting up or blinking the light-emitting unit.

When a customer has made a reservation for a transaction, i.e., a coupon, by using the mobile terminal 400, the "number of coupons" in the transaction data 32 shown in FIG. 5 is updated, and the remaining number of coupons is decremented by one. Then, information of the reserved transaction, i.e., information of the reserved coupon, is registered in the coupon data 33 in the memory 30.

[Coupon Data 33]

FIG. 6 shows an example of the coupon data 33 stored in the memory 30 of the management server 10. While the transaction data 32 is used for managing each transaction that issues a plurality of coupons, the coupon data 33 is used for managing each reserved coupon. The coupon data 33 includes items such as "coupon ID", "status", "reservation terminal ID", "coupon reservation date and time", "reservation expiration date and time", "coupon issuance date and time", "coupon expiration date", and "coupon use date and time".

The "coupon ID" is identification information for managing each reserved coupon. Each coupon ID is created by combining the corresponding transaction ID managed in the transaction data 32 shown in FIG. 5 with a number indicating the reservation order. Specifically, for example, among ten coupons of the transaction ID "0003" which are open for reservations, the coupon ID of a coupon reserved first is "0003-1", and the coupon ID of a coupon reserved next is "0003-2". A plurality of coupons reserved for the same transaction can be individually recognized and managed based on the coupon ID. In addition, when the transaction data 32 shown in FIG. 5 is referred to based on the transaction ID included in the coupon ID, the transaction content set for this coupon, such as the depositing content, commodity, benefit, etc., can be specified.

The item "status" shown in FIG. 6 is information indicating the status of each coupon. When a transaction, i.e., a coupon, has been reserved and registered in the coupon data 33, the "status" becomes "reserved" as shown in FIG. 6. When the customer has performed the depositing process with the deposit receiving apparatus 200 in the store 3 while the reservation is valid, the transaction is established, and the reserved coupon is issued. At this time, the "status" is updated from "reserved" to "issued". When the customer has used the issued coupon in the store 3, the "status" is updated from "issued" to "already-used". If the customer has not performed the depositing process for the reserved coupon while the reservation is valid, the "status" is updated from "reserved" to "reservation invalid". If the customer has not used the issued coupon while the coupon is valid, the "status" is updated from "issued" to "invalid".

A coupon ID whose status is "reserved", i.e., identification information of a reserved coupon, is used as transaction identification information for identifying the reserved transaction. The reservation information reader 270 reads a QR code including the identification information of the reserved coupon and inputs the read identification information into the deposit receiving apparatus 200. The reservation information reader 270 functions as an input device for inputting the transaction identification information into the deposit receiving apparatus 200. A coupon ID whose status is "issued", i.e., identification information of an issued coupon, is used as benefit identification information for recognizing the content of a benefit to be given on condition that the reserved transaction is established. The coupon information reader 370 reads a QR code including the identification information of the issued coupon and inputs the read identification information into the settlement apparatus 300. The coupon information reader 370 functions as an input device for inputting the benefit identification information into the settlement apparatus 300.

The "reservation terminal ID" shown in FIG. 6 is identification information for identifying the mobile terminal 400 with which a customer has reserved a coupon. For example, an IMEI (International Mobile Equipment Identity) that is unique information assigned to each of cellular phones and tablets is used as a reservation terminal ID. In the transaction management system 1, each mobile terminal 400 is identified based on the reservation terminal ID to manage the coupon.

The item "coupon reservation date and time" shown in FIG. 6 is information indicating date and time when a customer reserved a coupon. The item "reservation expiration date and time" is information indicating the expiration date and time until when the customer can acquire the reserved coupon. That is, the coupon reservation date and time indicates date and time when the customer reserved a transaction, and the reservation expiration date and time indicates date and time until when the customer can perform the reserved transaction. The item "coupon issuance date and time" is information indicating date and time when the coupon was issued after the customer performed the depositing process to establish the transaction. The item "coupon expiration date" is information indicating expiration date until when the customer can use the issued coupon. The item "coupon use date and time" is information indicating date and time when the customer used the coupon.

For example, the coupon having the coupon ID "0003-1" shown in FIG. 6 is a coupon that was reserved at 13:34 on Jan. 14, 2018 as indicated in the item "coupon reservation date and time". Meanwhile, as for the coupon regarding the transaction ID "0003", as indicated by the transaction data 32 shown in FIG. 5, the reservation validity period for this coupon is set to 1 hour after the reservation. Therefore, the reservation expiration date and time of the coupon having the coupon ID "0003-1" shown in FIG. 6 is 14:34 on Jan. 14, 2018, which is 1 hour after the coupon reservation date and time. The coupon having the coupon ID "0003-1" was issued at 13:50 on Jan. 14, 2018 as indicated in the item "coupon issuance date and time". This means that the depositing process set for this coupon was appropriately executed before the reservation expiration date and time to establish the reserved transaction, and the coupon was issued. The coupon usable period of the coupons set for the transaction ID "0003" is set to 1 week after the issuance as indicated by the transaction data 32 shown in FIG. 5. Therefore, the coupon expiration date of the coupon having the coupon ID "0003-1" shown in FIG. 6 is Jan. 21, 2018, which is 1 week after the coupon issuance date and time. As shown in the item "coupon use date and time", the coupon having the coupon ID "0003-1" was used at 14:31 on Jan. 14, 2018. This means that the coupon was appropriately used before the coupon expiration date.

[Examples of Screens of Store Terminal 100 and Mobile Terminal 400]

Processes executed in the transaction management system 1 will be described, with specific examples of screens displayed on the operation/display unit 120 of the store terminal 100 and the operation/display unit 420 of the mobile terminal 400. Although "money" as a subject of transaction in the transaction management system 1 includes at least one of "banknote" and "coin", examples of transaction in which coins are processed will be described hereinafter.

FIGS. 7A and 7B to FIG. 10 show examples of screens displayed on the operation/display unit 120 while a clerk of the store 3 creates a transaction content by operating the store terminal 100. FIG. 11 to FIGS. 16A to 16D show examples of screens displayed on the operation/display unit 420 while a customer browses transaction contents released on the internet 2, selects a coupon, and reserves the coupon by operating the mobile terminal 400. FIGS. 17A to 17C and FIGS. 18A to 18C show examples of screens displayed on the operation/display unit 420 of the mobile terminal 400 after the customer has reserved the coupon. As described above, processes related to transactions correspond to processes related to coupons. For example, reservation and establishment of a transaction correspond to reservation and issuance of a coupon. Hereinafter, the processes related to coupons will be mainly described.

[Confirmation Screen for Inventory Quantity in Store 3]

Figure 7A:
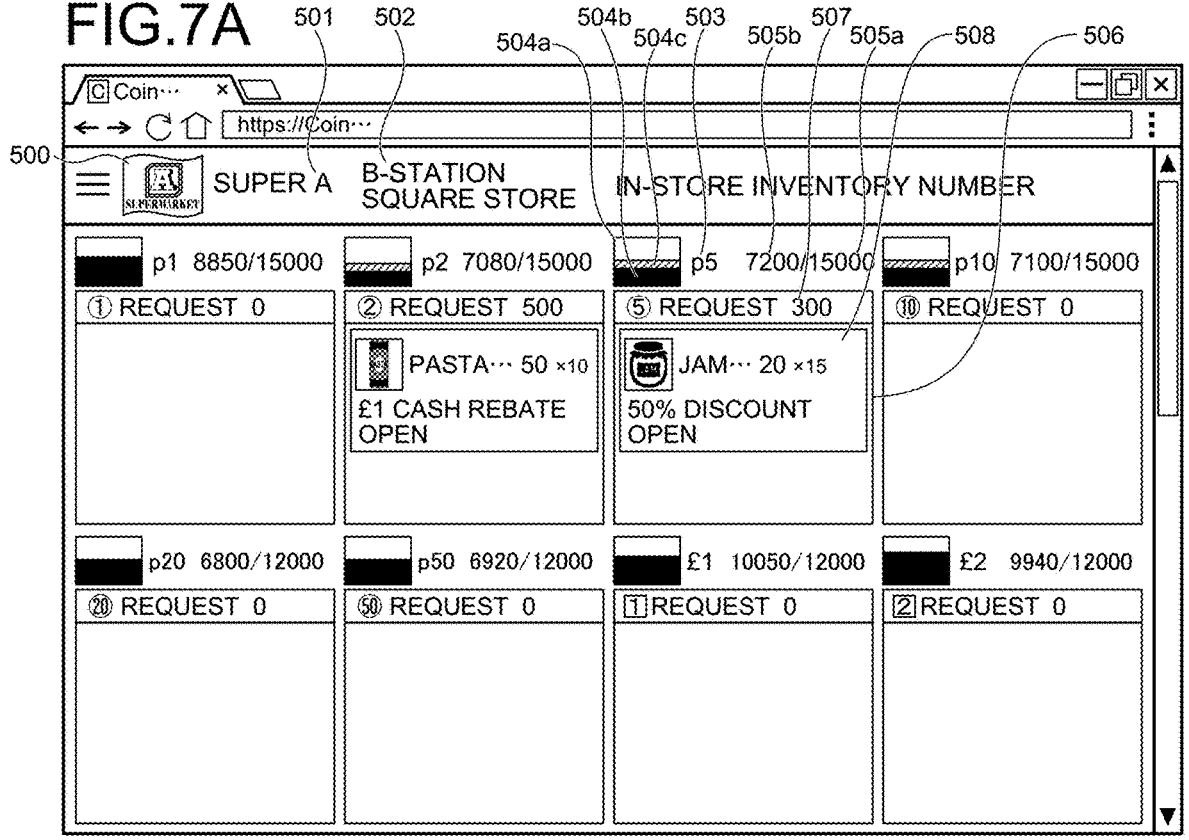
FIGS. 7A and 7B show examples of a screen displayed on a store terminal when an inventory quantity of money in a store is confirmed.
Figure 7B:
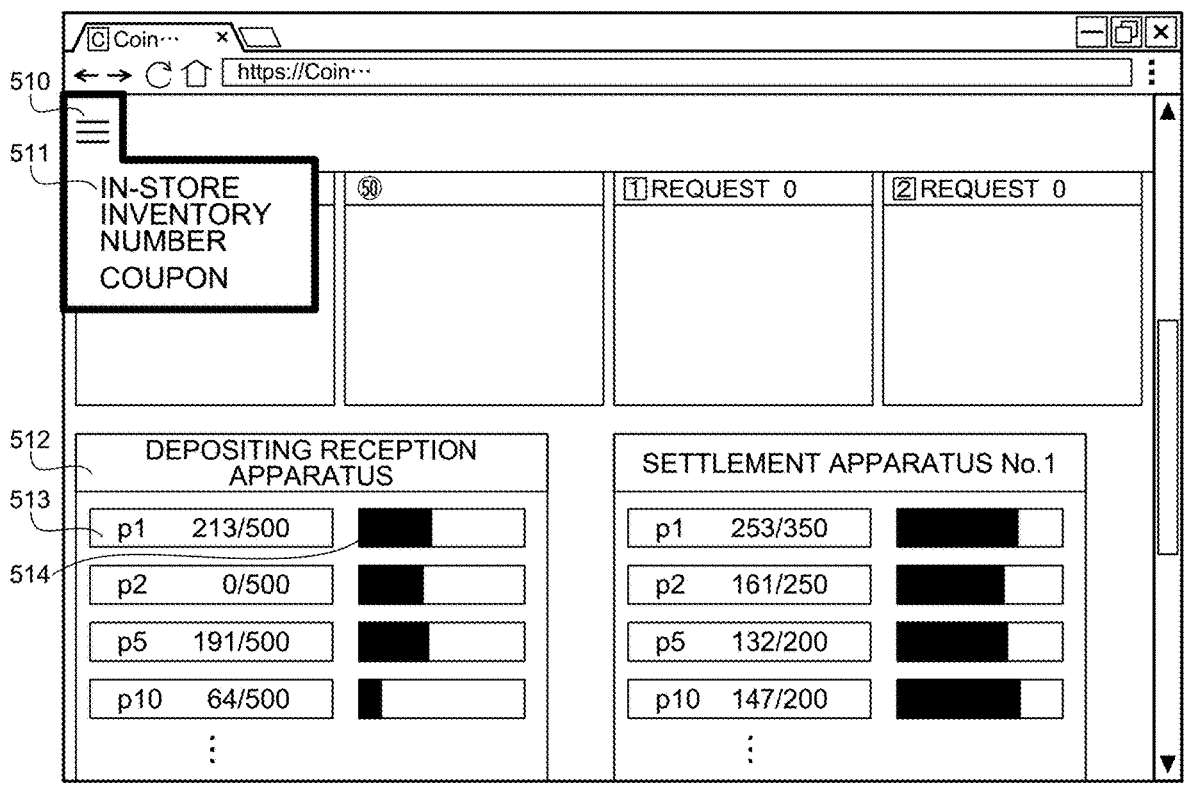

FIGS. 7A and 7B show examples of screens displayed on the store terminal 100 when confirming the inventory quantity of money in the store 3. When the screen shown in FIG. 7A is scrolled upward, the screen shown in FIG. 7B is displayed. When the store 3 is "B-station square store" of the company "Super A" shown in the store data 31 of FIG. 4, the screens shown in FIGS. 7A and 7B is displayed through a predetermined operation performed on the operation/display unit 120 of the store terminal 100.

As shown in FIG. 7A, in an upper portion of the screen displaying the inventory quantity of money in the store 3, a logo image 500, a company name 501, and a store name 502 of a company registered in the store data 31 are displayed. On the screen shown in FIG. 7A, information of a plurality of coin denominations are displayed. Specifically, information of 8 kinds of coin denominations used in the United Kingdom, i.e., 1-penny coin (p1), 2-pence coin (p2), 5-pence coin (p5), 10-pence coin (p10), 20-pence coin (p20), 50-pence coin (p50), 1-pound coin (£1), and 2-pound coin (£2), are displayed.

The information of each denomination includes: the denomination 503; the number of coins 505$a$ which is the total sum of upper-limit numbers of coins storable in the respective money handling apparatuses in the store 3; and the number of coins 505$b$ which is the total sum of the numbers of coins being currently stored in the respective money handling apparatuses in the store 3. For example, the number of coins 505$a$ regarding 5-pence coin indicates that the total sum of the upper-limit numbers of 5-pence coins storable in the money handling apparatuses in the store 3, such as the deposit receiving apparatus 200 and the settlement apparatus 300, is 15000. Meanwhile, the number of coins 505$b$ regarding 5-pence coin indicates that the total sum of the numbers of 5-pence coins being stored in the money handling apparatuses in the store 3 is 7200.

The information of each denomination includes a graphic 504 (504$a$ to 504$c$) indicating the ratio of the number of coins 505$b$ currently present in the store 3 to the upper-limit number of coins 505$a$. For example, as shown in FIG. 7A, the upper-limit number of coins 505$a$ is indicated by a rectangular frame 504$a$. In the frame 504$a$, the number of coins 505$b$ present in the store 3 is indicated by a filled rectangular region 504$b$. The ratio of the area of the filled rectangular region 504$b$ to the area of the rectangular frame 504$a$ represents the ratio of the number of coins 505$b$ to the number of coins 505$a$. When the number of coins 505$b$ present in the store 3 decreases, the height of the filled rectangular region 504$b$ in the frame 504$a$ decreases. When the number of coins 505$b$ increases because of deposited coins, the height of the filled rectangular 504$b$ increases. When 5-pence coins have been stored up to the upper limit in all the money handling apparatuses, the entirety of the rectangular frame 504$a$ is filled.

The information of each denomination includes a request number 507. The request number 507 is the total number of coins that is requested to customers to perform depositing, by creating a coupon of the store. In a frame 506 below the request number 507, coupon information 508 indicating the coupon that is open for reservations, is displayed. The coupon information 508 displayed in the frame 506 corresponds to the information registered in the transaction data 32 shown in FIG. 5.

For example, when only two transaction IDs "0001" and "0002" shown in FIG. 5 are being registered in the transaction data 32, the screen shown in FIG. 7A is displayed. The data of the transaction ID "0002" shown in FIG. 5 indicates that the B-station square store of Super A indicated in the store data 31 of FIG. 4 is accepting reservations for a transaction of depositing twenty 5-pence coins, and a coupon for 50% discount from the price of a commodity of commodity ID "003" in this store will be issued for each of 15 customers having deposited these coins. The coupon information 508 for 5-pence coin shown in FIG. 7A indicates the information of the transaction ID "0002". From "20×15" displayed on the screen shown in FIG. 7A, the clerk can confirm that 15 coupons, each requesting depositing of twenty 5-pence coins in exchange for the coupon, are open for reservations. From the request number 507 displayed on the screen, the clerk can confirm that, if all the coupons currently open for reservations have been reserved and the depositing process for each coupon has been completed, the number of 5-pence coins in the store 3 is increased by 300 in total. When there are a plurality of kinds of coupons currently open for reservation with respect to the same denomination, coupon information 508 of the respective coupons are listed in the frame 506. In this case, the total number of coins that are planned to be deposited regarding the respective coupons is displayed as the request number 507.

In the graphic 504 for indicating the number of coins, the request number 507, i.e., information of the number of coins planned to be deposited, is also displayed. Specifically, as shown in FIG. 7A, within the rectangular frame 504a, a rectangular region 504c corresponding to the request number 507 is displayed so as to be stacked on the rectangular region 504b indicating the number of coins 505b present in the store 3. The rectangular region 504b and the rectangular region 504c are distinguishably displayed in different colors, patterns, etc.

Scrolling up the screen shown in FIG. 7A allow the clerk to confirm inventory information in each money handling apparatus installed in the store 3 as shown in FIG. 7B. The inventory information of each money handling apparatus includes identification information 512 such as the name, serial number, identification No., etc., for identifying the apparatus. The inventory information further includes money information 513 including denominations of money stored in the apparatus, the upper-limit number of storable coins for each denomination, and the number of coins being currently stored for each denomination. Further, the inventory information includes a graphic 514 indicating the ratio of the upper-limit number of coins to the current number of coins. Like the graphic 504, this graphic 514 also includes a rectangular frame indicating the upper-limit number of coins, and a filled rectangular region in the frame indicating the current number of coins. From the screen shown in FIG. 7B, the clerk can confirm the denominations of money being stored in each money handling apparatus in the store 3, the upper-limit number of storable coins for each denomination, and the number of coins being currently stored for each denomination. Although FIG. 7B shows only the denominations of coins, the clerk can confirm information of banknotes being stored in the storage units of the money handling apparatus, such as 5-pound note, 10-pound note, 20-pound note, and 50-pound note. When cash vouchers are stored in the storage units of the deposit receiving apparatus 200, the clerk can confirm the value and the number of the cash vouchers being stored in each storage unit.

As shown in FIG. 7B, a menu 511 appears by pressing a menu button 510 at the upper left corner of the screen. The clerk confirms the inventory quantity of money in the store 3, information of each coupon currently open for reservations, the kind and quantity of money planned to be deposited by the coupon, and the like. Then, the clerk selects "coupon" from the menu 511 to start creation of a coupon.

[Coupon Creation Screen]

Figure 8A:
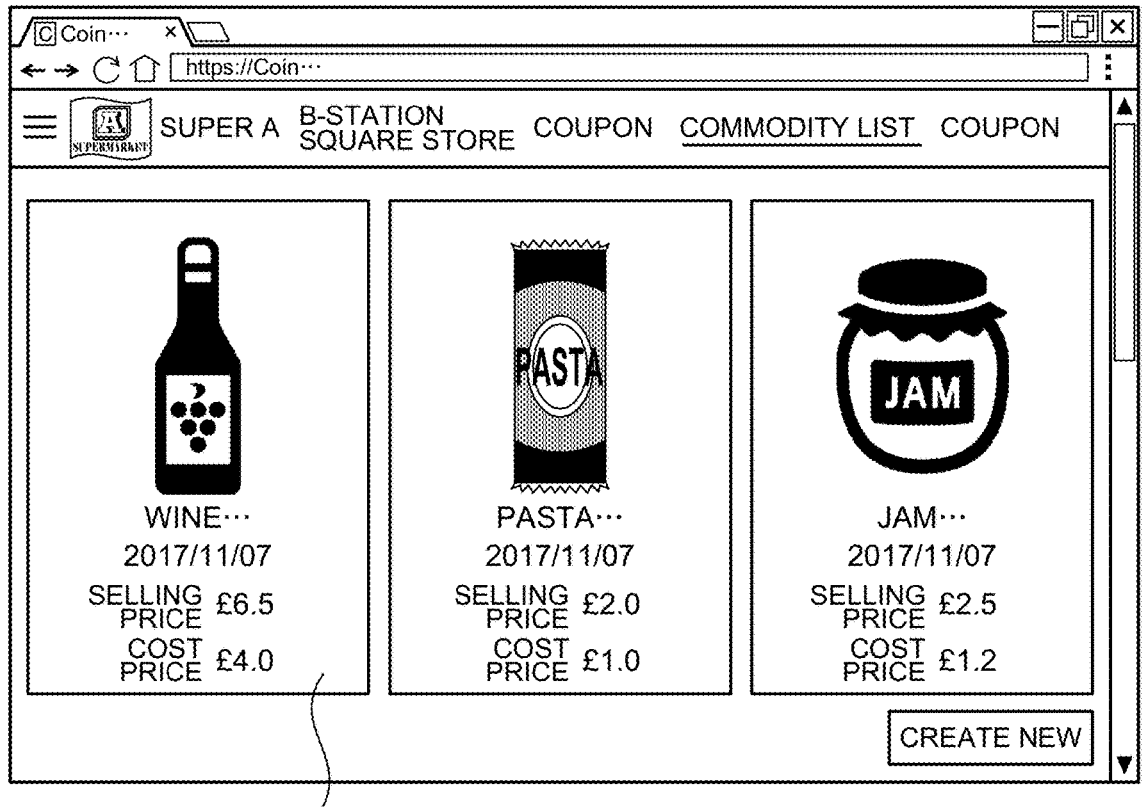
FIGS. 8A and 8B show examples of a screen displayed on the store terminal when a coupon is created.
Figure 8B:
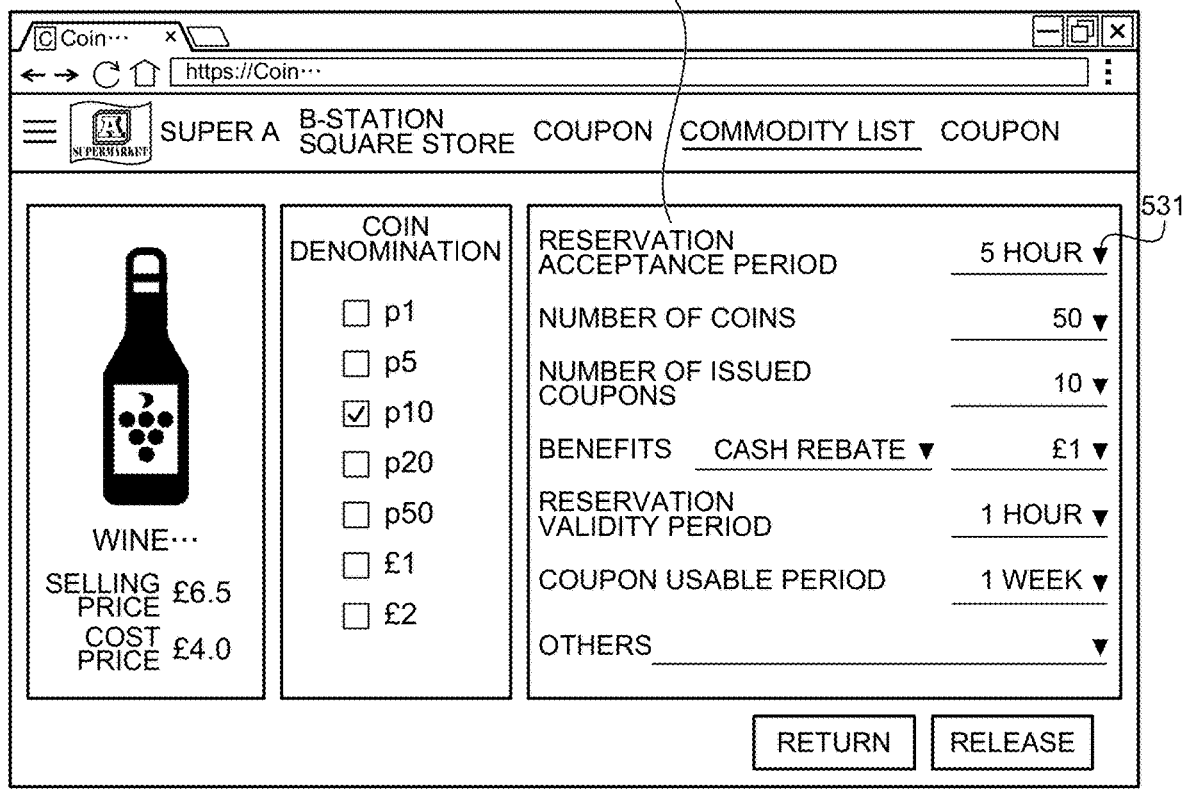

FIGS. 8A and 8B show examples of a screen displayed on the store terminal 100 when creating a coupons. When "coupon" on the menu 511 shown in FIG. 7B is selected, commodity information 520 of commodities for which coupons were created in the store 3 in the past is displayed in a list as shown in FIG. 8A. The commodity information 520 includes information such as: an image and the name of the commodity; date on which a coupon was created in the past by adding this commodity; and the selling price and cost price of the commodity. The commodity information 520 corresponds to the information registered in the store data 31 shown in FIG. 4. Specifically, the information registered in the item "commodity" in the store data 31 is displayed in a list as shown in FIG. 8A. The clerk can select a commodity for which he/she wants to create a coupon, from among the listed commodities. If the clerk wants to create a coupon not for the listed commodities but for a new commodity, the clerk presses a "Create New" button displayed at the lower right corner of the screen shown in FIG. 8A. Then, the clerk registers the new commodity to create a new coupon. Information of the new commodity is registered in the store data 31.

When the clerk performs an operation to select a commodity, for which a coupon is created, on the screen shown in FIG. 8A, an input screen for coupon information is displayed. For example, when the clerk selects "wine" on the screen shown in FIG. 8A, an input screen shown in FIG. 8B is displayed.

As shown in FIG. 8B, on the input screen, the image, the selling price, and the cost price of the commodity selected on the screen shown in FIG. 8A are displayed. In addition, coin denominations are listed. A check box is added to each coin denomination. The clerk can select a coin denomination for which depositing is requested to customers, through an operation of checking the corresponding check box.

On the input screen, an input frame 530 for inputting transaction information is displayed. Within the input frame 530, items for which entries are required are listed. When the clerk presses a triangular list button 531 disposed near an under line corresponding to each item, options of possible entries for the item are listed. The clerk selects a content for the coupon from the listed options. By performing this operation for the respective items in order, the clerk can easily input the transaction information.

For example, when the clerk presses a list button near a left-side under line of the item "benefit" in the input frame 530 shown in FIG. 8B, options for the price such as "cash rebate" and "percent discount" are displayed. After selecting one of these options, the clerk presses a list button near a right-side under line, whereby options corresponding to the selected content are displayed. For example, when the clerk selects "cash rebate" at the left-side under line, options of monetary amounts such as "£1" (1-pound) and "p50" (50-pence) are displayed at the right-side under line. The clerk can select an amount of cash rebate from the displayed options. Alternatively, when the clerk selects "percent discount" at the left-side under line, options of discount rates such as "5%" and "10%" are displayed at the right-side under line, and the clerk can select a discount rate from these options.

After setting the content of the coupon on the screen shown in FIG. 8B, the clerk presses a "Release" button at the lower right corner of the screen. As a result, the transaction content set on the screen is registered in the transaction data 32 of the management server 10. For example, when the clerk presses the "Release" button with the setting content shown in FIG. 8B while only two transaction IDs "0001" and "0002" are registered in the transaction data 32, data of the transaction ID "0003" is registered as shown in FIG. 5. The clerk can return to the screen shown in FIG. 8A by pressing a "Return" button at the lower right corner of the screen shown in FIG. 8B.

After the clerk has pressed the "Release" button on the screen shown in FIG. 8B, coupons created in the store 3 and being open for reservations are listed on the screen. FIG. 9 shows an example of the screen of the store terminal 100 on which the coupons being open for reservations are listed. On the screen, coupon information 540 is displayed for each coupon. The coupon information 540 corresponds to the transaction data 32 shown in FIG. 5. That is, the coupons being open for reservations are listed based on the information registered in the transaction data 32. At the bottom of each frame, the number of reserved coupons is displayed as "number of reservations". If there is no customer who has reserved a coupon, the number of reservations is displayed as "0" (zero), and a "Delete" button 541 is displayed. After a coupon has been created and released on the internet 2, if no customer has reserved this coupon, the clerk can delete this coupon by pressing the "Delete" button 541. If there is even one customer who has reserved the coupon, the "Delete" button 541 is not displayed, and the clerk cannot delete the coupon.

Figure 10:
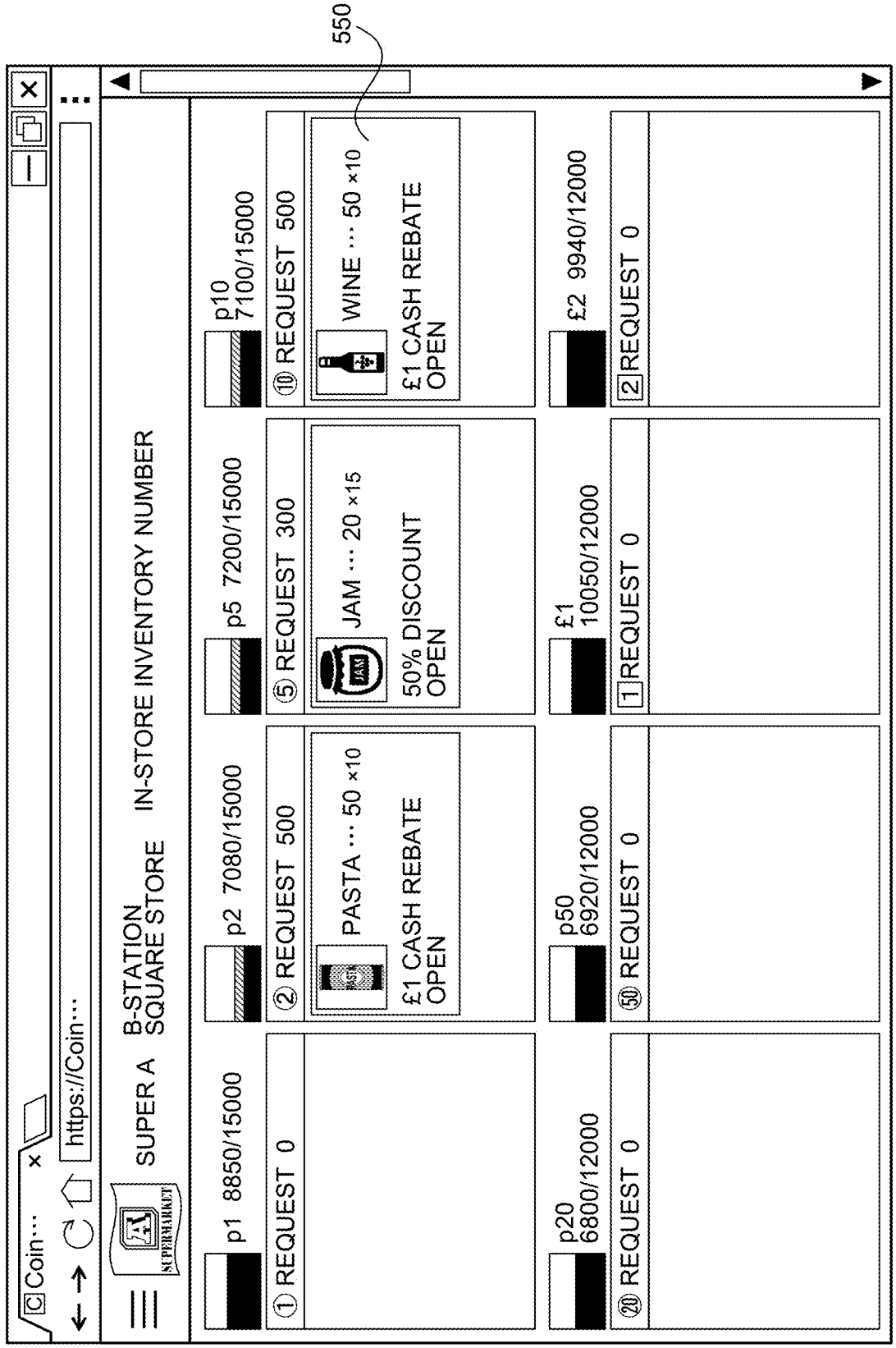
FIG. 10 shows an example of an inventory quantity confirmation screen after a coupon has been added.

After a new coupon has been created, when the clerk presses the menu button 510 shown in FIG. 7B and selects "in-store inventory quantity" on the screen, updated information is displayed. FIG. 10 shows an example of an inventory quantity confirmation screen after the coupon is added. When the coupon has been newly created as shown in FIG. 8B at the state shown in FIG. 7A and the created new coupon is released, updated information, in which new coupon information 550 is added, is displayed as shown in FIG. 10.

The management server 10 releases, on the internet 2, the coupon having been created in the store 3 and registered in the transaction data 32. The customer selects a coupon from among a plurality of coupons released by the management server 10 by using the mobile terminal 400.

[Store Designation/Search Screen of Mobile Terminal 400]

Figure 11:
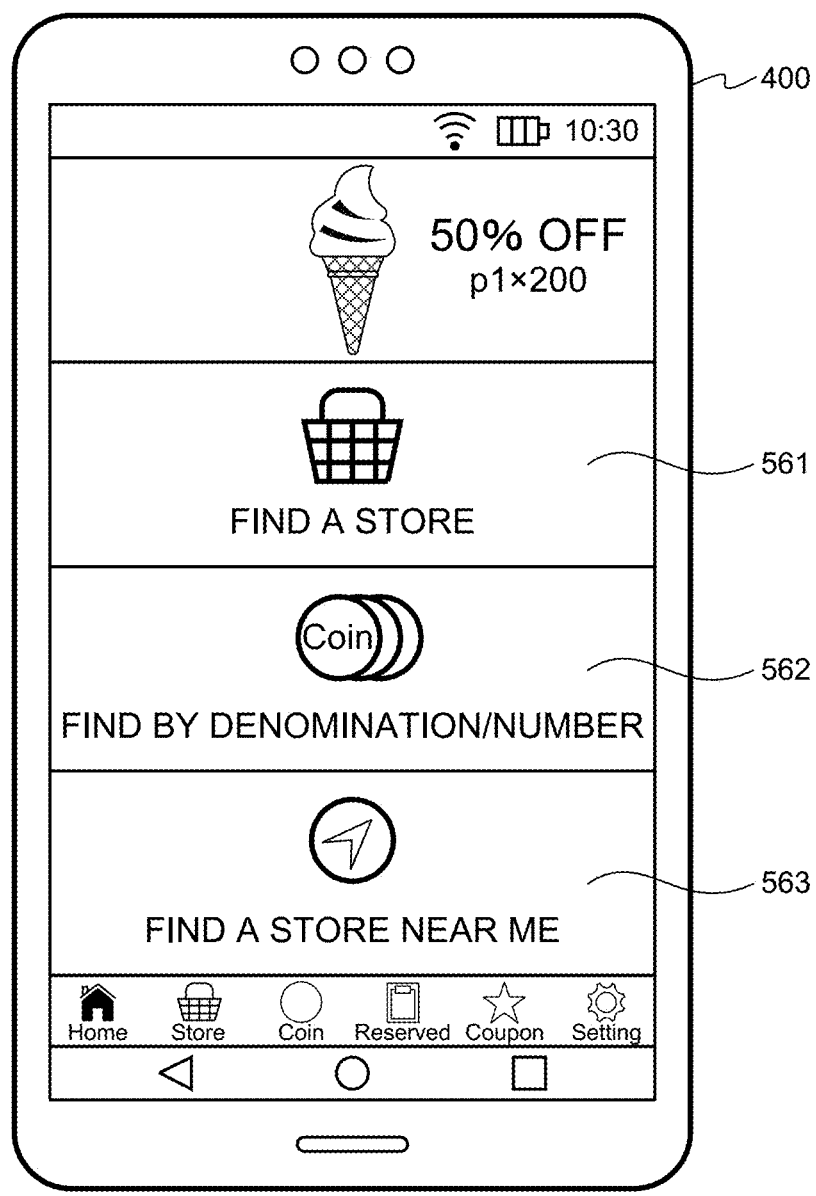
FIG. 11 shows an example of an initial screen displayed when browsing of coupons is started on a mobile terminal.

FIG. 11 shows an example of an initial screen displayed on the mobile terminal 400 when starting to browse coupons with the mobile terminal 400. As shown in FIG. 11, an advertisement is displayed at the top of the initial screen. Three menus, i.e., a store designation/search menu 561, a coin designation/search menu 562, and a location designation/search menu 563, are displayed below the advertisement. When the customer wants to search for a coupon by designating a store, the customer selects the store designation/search menu 561 which is displayed as "Find a store" on the initial screen.

While the entirety of the mobile terminal 400 is shown in FIG. 11, only the screen of the mobile terminal 400 is shown in the following figures. In the following figures, an icon 570 displayed at the upper left corner of the screen as shown in FIG. 12A is a button to go back to a previous screen. In the following description, operations, such as "selecting" and "pressing" menus and icons on the screen of the mobile terminal 400, correspond to an operation performed by tapping the touch-panel type operation/display unit 420.

FIGS. 12A to 12D show examples of the screen displayed on the mobile terminal 400 when the store designation/search menu 561 is selected. When the customer selects the store designation/search menu 561, a list of categories is displayed as shown in FIG. 12A. The listed categories correspond to those of the item "category" in the store data 31 shown in FIG. 4.

When the customer selects a category on the screen shown in FIG. 12A, companies that belong to the selected category are listed as shown in FIG. 12B. The listed companies correspond to those of the item "company" of the store data 31 shown in FIG. 4. For example, when "supermarket" is selected on the screen shown in FIG. 12A, companies that are categorized as "supermarket" in the item "category" in the store data 31 are listed. As shown in FIG. 12B, information of each listed company includes the logo image and the name of the company.

When the customer selects a company on the screen shown in FIG. 12B, stores that belong to the selected company are listed as shown in FIG. 12C. The listed stores correspond to those of the item "store" in the store data 31 shown in FIG. 4. For example, when "Super A" is selected on the screen shown in FIG. 12B, stores registered as the stores of "Super A" in the item "store" in the store data 31 are listed. As shown in FIG. 12C, information of each listed store includes the logo image of the company, the name of the store, and a time required when the customer goes to the store from the current location where he/she is operating the mobile terminal 400. The required time includes a time required for traveling on foot, a time required for traveling by car, and a time required for traveling by public transportation such as railway. Each required time is calculated by the mobile terminal 400 that performs route search based on the current location recognized with GPS, and location information of each store included in the store data 31.

When the customer selects a store on the screen shown in FIG. 12C, coupons that are open for reservations in this store are listed as shown in FIG. 12D. The coupons listed at this time correspond to the coupons, whose statuses are "open for reservations", registered in the transaction data 32 shown in FIG. 5. For example, when "B-station square store" is selected on the screen shown in FIG. 12C, coupons that are open for reservations in "B-station square store" of "Super A" are listed as shown in FIG. 12D. Information of each listed coupon includes: an image and the name of a commodity as the subject of the coupon; and the content of a benefit such as a cash rebate or a percent discount applied to the commodity. The information of each listed coupon further includes: a remaining time 571 until reservations for the coupon are closed; denomination and number of coins set as a depositing content in exchange for the coupon; and a "Reserve" button. The coupon for wine shown in FIG. 12D corresponds to the transaction ID "0003" shown in FIG. 5.

Figure 13B:
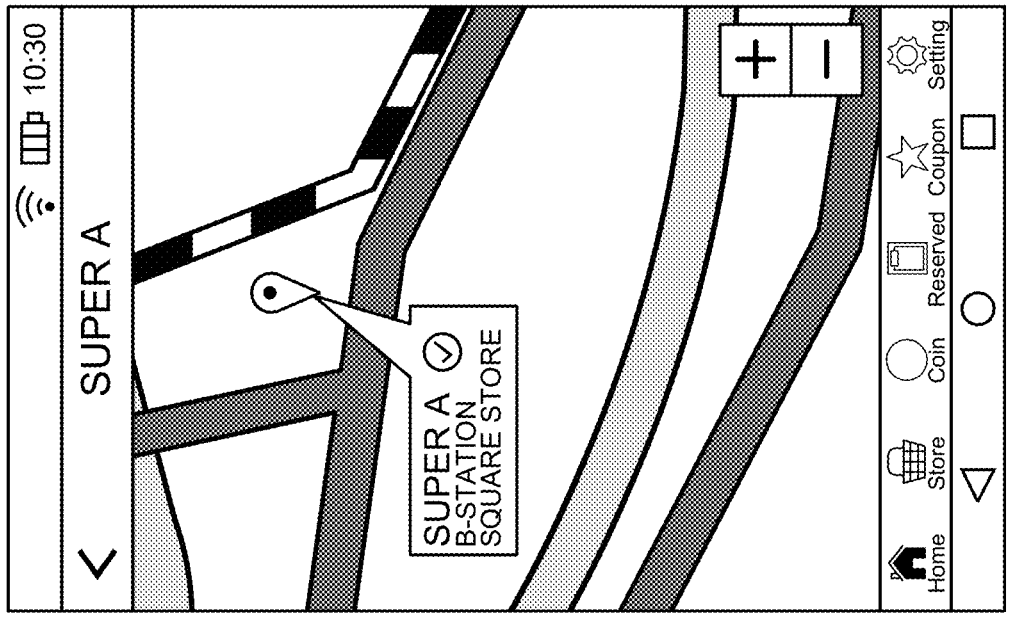
FIGS. 13A and 13B show examples of a map screen on which locations of stores are confirmed.
Figure 13A:
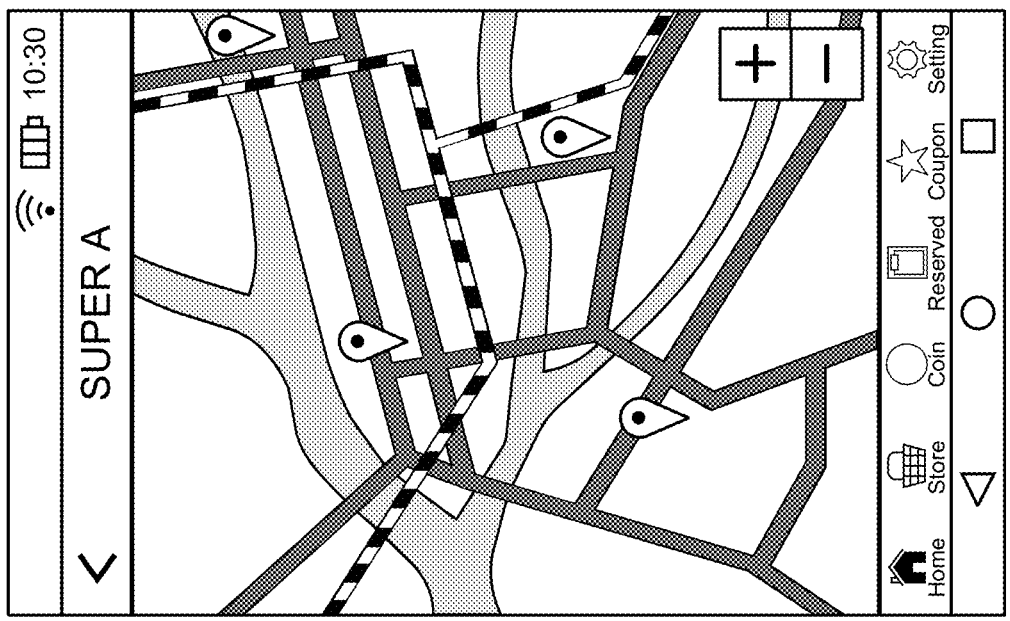

A "Map" button is displayed at the upper right corner of the list display screen shown in FIG. 12C, and at the upper right corner of each coupon information shown in FIG. 12D. Pressing the "Map" button allows the customer to confirm the location of the store on the map. FIGS. 13A and 13B show examples of a map screen used for confirming the location of the store. When the "Map" button is pressed on the screen shown in FIG. 12C on which the stores of Super A are listed, a map on which pin icons indicate the respective listed stores of Super A, is displayed as shown in FIG. 13A. When the "Map" button is pressed on the screen shown in FIG. 12D on which the coupons from the B-station square store of Super A are listed, a map on which a pin ion indicates this store is displayed as shown in FIG. 13B.

When the customer presses the "Reserve" button on the screen shown in FIG. 12D, a reservation for the coupon is established, and the coupon enters the reserved state. Information of the reserved coupon is registered in the coupon data 33 shown in FIG. 6. For example, when the customer presses the "Reserve" button on the screen shown in FIG. 12D, data indicated as the coupon ID "0003-3" in FIG. 6 is registered in the coupon data 33.

Figure 14A:
FIGS. 14A and 14B show examples of a screen displayed on the mobile terminal after a reservation is established.
Figure 14B:

FIGS. 14A and 14B show examples of a screen displayed on the mobile terminal 400 after establishing the reservation.

When the customer presses the "Reserve" button on the screen shown in FIG. 12D, the screen shown in FIG. 14A is displayed. On this screen, information of the reserved coupon is displayed. Specifically, the information of the reserved coupon includes: an image and the name of a commodity as the subject of the reserved coupon; and the content of a benefit such as a cash rebate or a percent discount applied to the commodity. The information of the reserved coupon further includes: a remaining time 580 during which the customer can perform, in the store 3, depositing to acquire the reserved coupon; denomination and number of coins set as the depositing content to acquire the reserved coupon; a "Cancel" button; and a QR code. The QR code is information for identifying the reserved coupon displayed on the screen, and contains the coupon ID registered in the coupon data 33 shown in FIG. 6.

As for the coupon corresponding to the transaction ID "0003" shown in FIG. 5, the reservation validity period is set to "1 hour" after accepting the reservation. When the customer has reserved this coupon, the remaining time 580 is displayed as "1 hour" immediately after establishment of the reservation as shown in FIG. 14A. The remaining time 580 corresponds to the remaining time until the reservation expiration date and time in the coupon data 33 shown in FIG. 6.

After the customer has reserved a coupon, the customer can cancel the reservation. When the customer presses the "Cancel" button on the screen shown in FIG. 14A, another "Cancel" button and a "Return" button are displayed over the QR code on the lower portion of the screen as shown in FIG. 14B. The customer can suspend the cancellation of the reservation by pressing the "Return" button. The customer can cancel the reservation of the coupon by pressing the "Cancel" button. When the customer has cancelled the reservation, data of the corresponding coupon is deleted from the coupon data 33 shown in FIG. 6.

[Coin Designation/Search Screen]

Figure 15A:
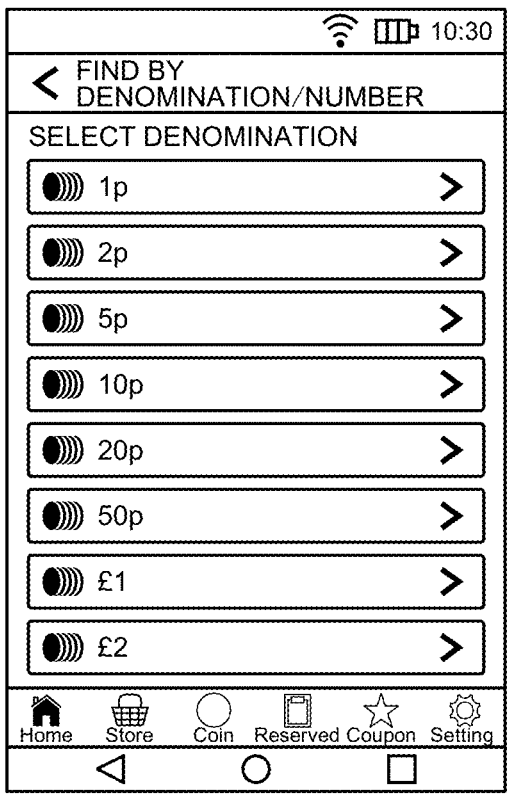
FIGS. 15A to 15C show examples of a screen displayed on the mobile terminal when a coin designation/search menu is selected.
Figure 15B:
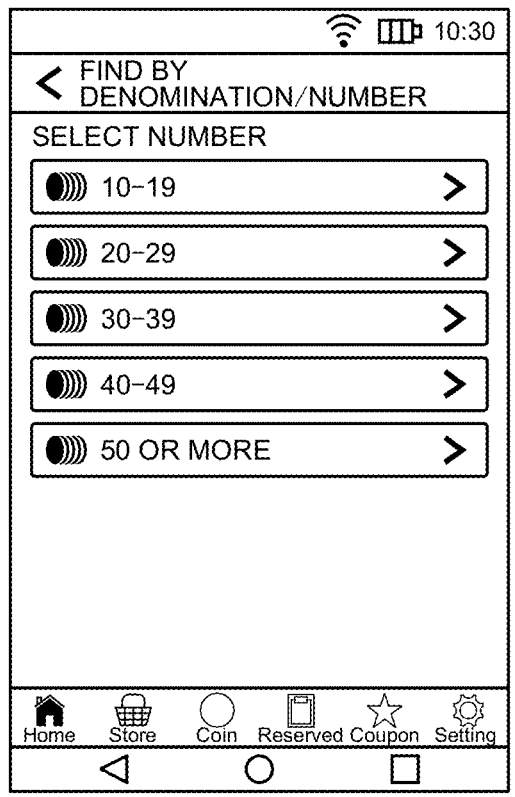
Figure 15C:
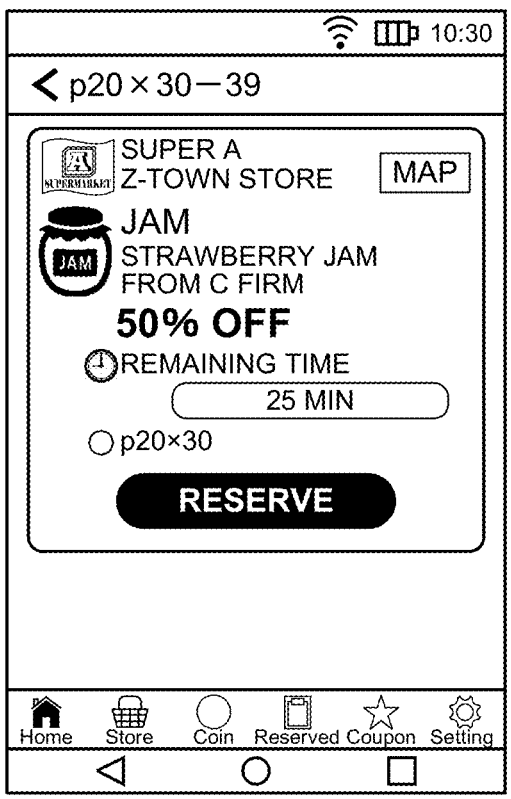

When the customer wants to search for a coupon based on the denomination and number of coins that he/she possesses, the customer selects a coin designation/search menu 562 which is displayed as "Find by denomination/number" on the initial screen shown in FIG. 11. FIGS. 15A to 15C show examples of a screen displayed on the mobile terminal 400 when the customer selects the coin designation/search menu 562.

When the customer selects the coin designation/search menu 562, coin denominations are listed as shown in FIG. 15A. When the customer selects a denomination on the screen based on the denomination of coins that he/she possesses, a screen for selecting the number of coins is displayed as shown in FIG. 15B. The number of coins is set with a range such as "10 to 19" and "20 to 29". When the customer selects the number of coins based on the number of coins that he/she possesses, coupons are listed as shown in FIG. 15C whose depositing contents set as coupon issuance conditions match the denomination and number of coins selected by the customer. Specifically, from among the coupons which are registered in the transaction data 32 shown in FIG. 5 and whose statuses are "open for reservations", coupons whose depositing contents satisfy the conditions of the denomination and number of coins selected by the customer are listed.

For example, when the customer selects "20-pence coin" on the screen shown in FIG. 15A, and "30 to 39" as the number of coins on the screen shown in FIG. 15B, a coupon that can be acquired by depositing thirty to thirty-nine 20-pence coins is displayed as shown in FIG. 15C. Although FIG. 15C shows the case where only one coupon satisfies the conditions selected by the customer, if there are a plurality of coupons satisfying the conditions, these coupons are listed on the screen.

When the customer selects a coupon from among the coupons listed on the screen and presses the "Reserve" button, the screen including the QR code of the reserved coupon is displayed on the screen of the mobile terminal 400 of the customer as already described with reference to FIGS. 14A and 14B.

[Location Designation/Search Screen]

When the customer wants to search for a coupon of a store close to the current location, the customer selects a location designation/search menu 563 which is displayed as "Find a store near me" on the initial screen shown in FIG. 11.

Figure 16A:
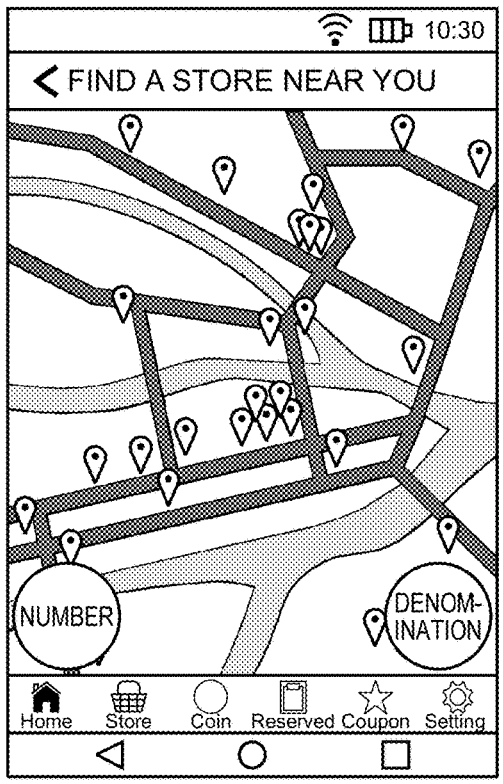
FIGS. 16A to 16D show examples of a screen displayed on the mobile terminal when a location designation/search menu is selected.
Figure 16B:
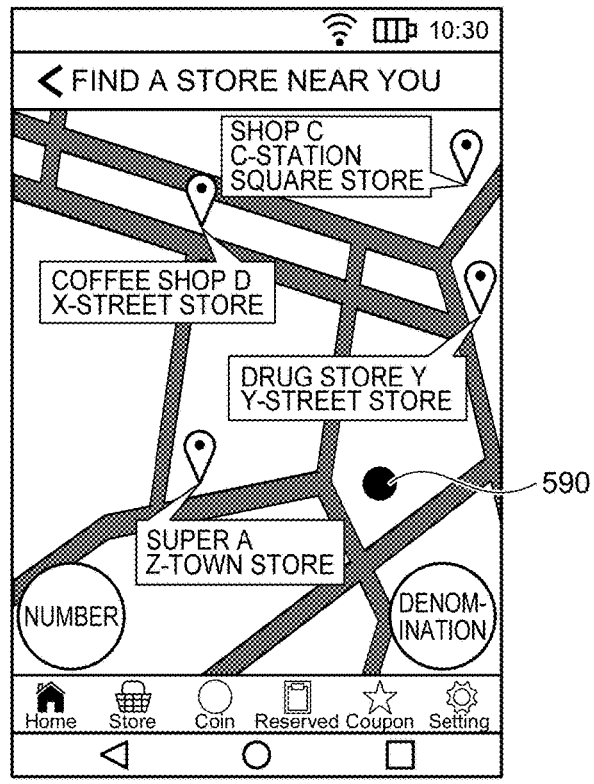

FIGS. 16A to 16D show examples of a screen displayed on the mobile terminal 400 when the customer has selected the location designation/search menu 563. When the customer selects the location designation/search menu 563, a map around the current location is displayed on the screen of the mobile terminal 400 as shown in FIG. 16A. On this map, stores accepting reservations for coupons are displayed with pin ions. The customer can change the scale of the map on the screen by operations such as pinch-in and pinch-out on the screen. For example, when pinch-out operation is performed on the screen shown in FIG. 16A, the map is enlarged as shown in FIG. 16B, and the search area can be narrowed down on the screen. Information displayed on the enlarged map includes: an icon 590 indicating the current location of the customer, i.e., the mobile terminal 400; pin icons indicating the locations of the respective stores; and store information such as the names of the stores indicated by the pin icons and the names of the companies to which the stores belong. The display of the map is performed based on the function of the mobile terminal 400 that recognizes the current position thereof by using GPS, and on the location information of each stored registered in the store data 31 shown in FIG. 4.

Figure 16C:
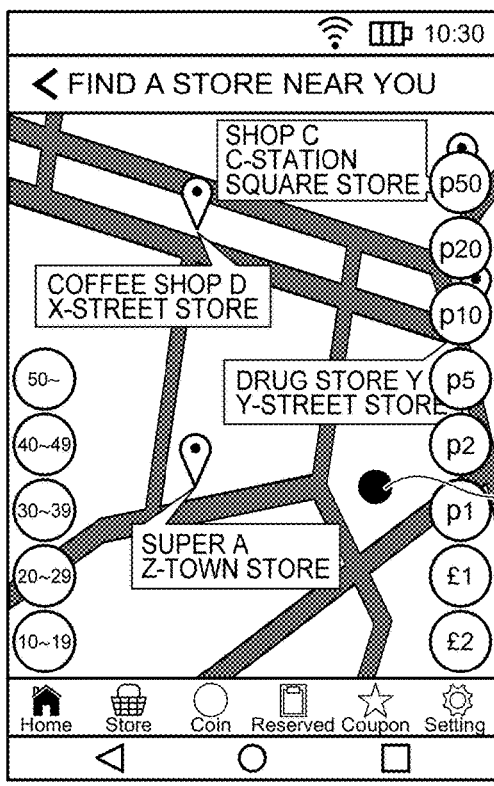

As shown in FIGS. 16A and 16B, a number icon for selecting the number of coins is displayed at the lower left corner of the map screen, and a kind icon for selecting a coin denomination is displayed at the lower right corner of the map screen. As shown in FIG. 16C, options of the number of coins are displayed when the number icon is pressed, and options of coin denominations are displayed when the kind icon is pressed. When the customer selects the displayed number of coins, only the pin icons and store information of the stores which are accepting reservations for coupons with the depositing contents that match the number of coins selected by the customer are displayed from among the plurality of stores that has been displayed on the map, while information of other stores disappears from the screen. When the customer selects a displayed coin denomination, only the pin icons and store information of stores which are accepting reservations for coupons with the depositing contents that match the coin denomination selected by the customer are displayed on the map, while information of other stores disappears from the screen. When the customer selects both the displayed number of coins and a displayed coin denomination, only the pin icons and store information of the stores, which are accepting reservations for coupons with the depositing contents that match the coin denomination and the number of coins selected by the customer, are displayed on the map, while information of other stores disappears from the screen. When the customer selects a store displayed on the map, coupons of this store, which match the conditions of coins selected by the customer, are displayed as shown in FIG. 12D. Specifically, coupons that satisfy the conditions of coins selected by the customer are displayed, from among the coupons which are registered in the transaction data 32 shown in FIG. 5 for the store displayed on the map and whose status are "open for reservations".

Figure 16D:
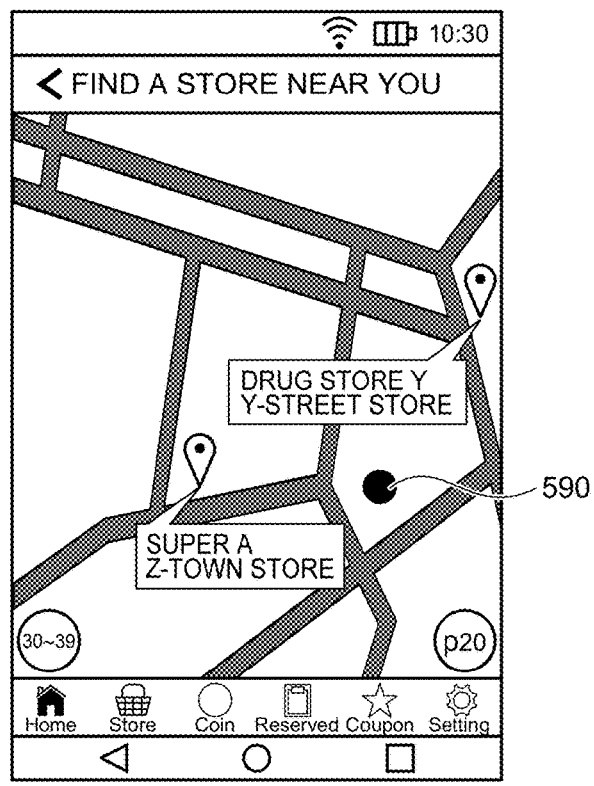

For example, on the screen shown in FIG. 16B, the customer selects "30 to 39" as the number of coins while operating the number icon, and selects "20-pence coin" while operating the kind icon. As a result, as shown in FIG. 16D, stores can be narrowed down to those accepting reservations for coupons on condition of depositing thirty to thirty-nine 20-pence coins. When the customer selects "Super A, Z town store" on the screen shown in FIG. 16D, a coupon of this store, which matches the conditions of the number and denomination of coins selected by the customer, is displayed as shown in FIG. 15C. When there are a plurality of coupons satisfying the conditions, these coupons are listed on the screen.

When the customer selects a coupon from among the coupons listed on the screen and presses the "Reserve" button, a screen including the QR code of the reserved coupon is displayed on the mobile terminal 400 of the customer as described while referring to FIG. 14.

As described above, when the customer has selected and reserved a coupon through the store designation/search, the coin designation/search, the location designation/search, and the like, information of the reserved coupon is registered in the coupon data 33 shown in FIG. 6.

[Reserved Coupon Display Screen]

Figure 17A:
FIGS. 17A to 17C show examples of a screen displayed on the mobile terminal after a coupon is reserved.
Figure 17B:
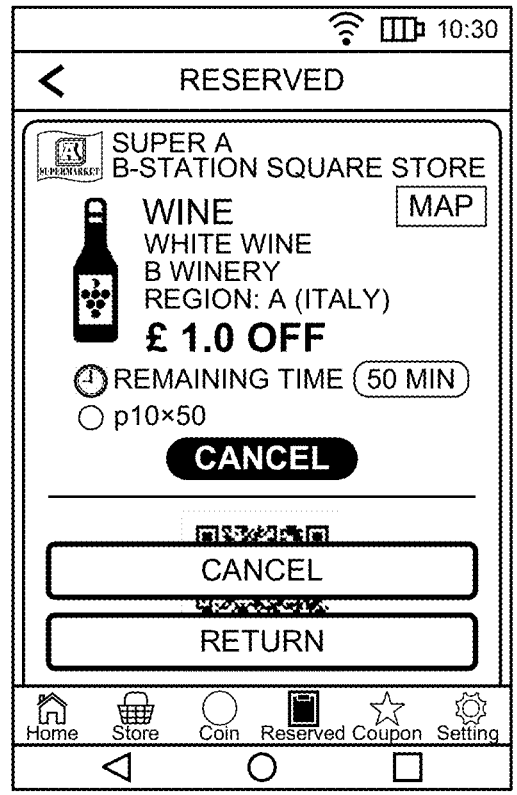
Figure 17C:

The customer can call, for confirmation, the reserved coupon on the screen by operating the mobile terminal 400. FIGS. 17A to 17C show examples of a screen displayed on the mobile terminal 400 after reservation of the coupon. The coupon reserved by the customer is displayed as shown in FIG. 17A when the customer pressed an icon 600 on the screen. The name of the company having created the coupon, the logo image of the company, the name of the store, the image and name of a commodity as the subject of the reserved coupon, and the content of a benefit such as a cash rebate or a percent discount applied to the commodity, are displayed on the screen. In addition, the remaining time during which the customer can perform, in the store 3, depositing to acquire the reserved coupon, the denomination and number of coins set as the depositing content to acquire the reserved coupon, a "Cancel" button, and a QR code, are displayed. The QR code is information for identifying the reserved coupon displayed on the screen, and includes the coupon ID in the coupon data 33 shown in FIG. 6.

The information on the screen shown in FIG. 17A corresponds to the coupon data 33 shown in FIG. 6. When the customer presses the icon 600 on the screen of the mobile terminal 400 to request the information of the reserved coupon, the management server 10 searches the data registered in the coupon data 33 shown in FIG. 6 for the data of the coupon reserved by the mobile terminal 400, and displays the found data. This search is performed based on the IMEI of the mobile terminal 400. The data of the coupon shown in FIG. 17A corresponds to the coupon of the coupon ID "0003-3" shown in FIG. 6.

The customer can cancel the reservation on the screen shown in FIG. 17A. When the customer presses the "Cancel" button on the screen, another "Cancel" button and a "Return" button are displayed over the QR code on the lower portion of the screen as shown in FIG. 17B. The customer can suspend the cancellation of the reservation by pressing the "Return" button. The customer can cancel the reservation by pressing the "Cancel" button. When the customer has cancelled the reservation, data of the corresponding coupon is deleted from the coupon data 33 shown in FIG. 6.

When the reservation validity period of the reserved coupon has expired without cancelling the reservation, the reserved coupon becomes invalid. As a result, the item "status" of the coupon data 33 shown in FIG. 6 is updated from "reserved" to "reservation invalid". In this case, when the customer performs an operation to confirm the reserved coupon, "Expired" is displayed on the screen as shown in FIG. 17C. On this screen, the name of the company having created the coupon, the logo image of the company, the name of the store, the image and the name of the commodity as the subject of the coupon that had been reserved, and the content of a benefit such as a cash rebate or a percent discount that would have been applied to the commodity, are displayed. In addition, the reservation expiration date and time, the denomination and number of coins set as the coupon issuance condition, and information indicating the expiration, are displayed.

When the customer who has reserved the coupon wants to perform the depositing process with the deposit receiving apparatus 200 in the store 3, the customer causes the reservation information reader 270 connected to the deposit receiving apparatus 200 to read the QR code of the reserved coupon which is displayed on the screen of the mobile terminal 400 as shown in FIG. 14A and FIG. 17A. When the customer performs the depositing process set as the coupon issuance condition, the coupon is issued as described above, and the customer can obtain the coupon. With the issuance of the coupon, the "status" in the coupon data 33 shown in FIG. 6 is updated from "reserved" to "issued".

[Issued Coupon Display Screen]

Figure 18A:
FIGS. 18A to 18C show examples of a screen displayed on the mobile terminal after a coupon is acquired.
Figure 18B:
Figure 18C:

The customer can call the acquired coupon on the screen for confirmation by operating the mobile terminal 400. FIGS. 18A to 18C show examples of a screen displayed on the mobile terminal 400 after acquiring the coupon. The screen of the issued coupon acquired by the customer is displayed as shown in FIG. 18A when the customer pressed an icon 610. The name of the company having created the coupon, the logo image of the company, the name of the store, the image and name of the commodity as the subject of the acquired coupon, the content of a benefit such as a cash rebate or a percent discount applied to the commodity, the coupon expiration date and time, and a "Use Coupon" button, are displayed on the screen.

The information on the screen shown in FIG. 18A corresponds to the coupon data 33 shown in FIG. 6. When the customer presses the icon 610 on the screen of the mobile terminal 400 to request the information of the issued coupon data, the management server 10 searches the data registered in the coupon data 33 shown in FIG. 6 for the data of the issued coupon acquired by the mobile terminal 400, and displays the found data on the screen. This search is performed based on the IMEI of the mobile terminal 400.

When the customer presses the "Use Coupon" button on the screen shown in FIG. 18A, a "Cancel" button is displayed instead of the "Use Coupon" button, and a QR code is displayed on a lower portion of the screen, as shown in FIG. 18B. The QR code is information for identifying the issued coupon displayed on the screen, and includes the coupon ID in the coupon data 33 shown in FIG. 6. When the customer presses the "Cancel" button, the customer goes back to the screen shown in FIG. 18A without using the coupon.

When the coupon expiration date and time of the issued coupon has expired without using the coupon, the issued coupon becomes invalid. As a result, the item "status" shown in FIG. 6 is updated from "issued" to "invalid". In this case, if the customer performs an operation to confirm the acquired coupon, "expired" is displayed on the screen as shown in FIG. 18C. On this screen, the name of the company having created the coupon, the logo image of the company, the name of the store, and the image and name of the commodity as the subject of the coupon that had been acquired, are displayed. In addition, the content of a benefit such as a cash rebate or a percent discount that would have been applied to the commodity, the coupon expiration date and time, and information indicating the expiration, are displayed.

When the customer who has acquired the coupon wants to use the coupon in the store 3, the customer causes the coupon information reader 370 connected to the settlement apparatus 300 to read the QR code of the issued coupon which is displayed on the screen of the mobile terminal 400 as shown in FIG. 18B. This allows the customer to purchase the commodity while taking the benefit of the coupon, such as a cash rebate or a percent discount. When the coupon has been used, the "status" in the coupon data 33 shown in FIG. 6 is updated from "issued" to "already used". This prevents repetitive use of the coupon.

In the present embodiment, a coupon is issued mainly on condition of depositing coins. However, a coupon may be issued on condition of depositing banknotes. Even in this case, processes such as creation of a transaction content that issues a coupon as a benefit, acceptance of reservations for the transaction, issuance of the coupon, and use of the coupon can be performed as described above.

Although the internet 2 is used in the present embodiment, available network is not limited thereto. For example, even when coupons of stores in a commercial facility are released on a private network, such as a local network of a large-scale commercial facility, processes such as creation, reservation, issuance, and use of the coupons can be performed as described above.

Although the respective mobile terminals 400, i.e., the respective customers, are distinguished from each other by using the IMEIs of the mobile terminals 400 in the present embodiment, the method for distinguishing the customers is not limited thereto. For example, a login ID and a password may be assigned to each customer, and login authentication may be performed when an operation related to a coupon is received from the mobile terminal 400 to distinguish the customer from other customers.

Although one deposit receiving apparatus 200 and one settlement apparatus 300 are installed in the store 3 shown in FIG. 1 in the present embodiment, the number of deposit receiving apparatuses 200 and settlement apparatuses 300 are not limited thereto. A plurality of deposit receiving apparatuses 200 each having a reservation information reader 270 may be installed in one store. Likewise, a plurality of settlement apparatuses 300 each having a coupon information reader 370 may be installed in one store. Although the deposit receiving apparatus 200 and the settlement apparatus 300 are installed in the store in the present embodiment, the deposit receiving apparatus 200 and the settlement apparatus 300 may be installed outside the store. For example, when a plurality of stores share the deposit receiving apparatus 200 and the settlement apparatus 300, these apparatuses 200 and 300 may be installed outside the stores. Even in this case, the above-described processes can be realized.

Although a QR code is used for exchanging identification information of a reserved coupon, an issued coupon, and the like in the present embodiment, the method for exchanging information is not limited thereto. For example, another optical code such as a barcode may be used. As for generation of an optical code, in the present embodiment, the mobile terminal 400 obtains identification information, and performs a dedicated application to encode the identification information, thereby generating an optical code. However, the method is not limited thereto. The management server 10 may encode the identification information to generate an optical code, and may transmit the optical code to the mobile terminal 400. As information for identifying each coupon, identification information obtained by combining characters, symbols, etc., may be used. In this case, the deposit receiving apparatus 200 and the settlement apparatus 300 each may optically read the identification information with a reading device using a camera or a scanner to perform information exchange, or may receive an input of the identification information through an input device such as a keyboard to perform information exchange. Alternatively, each apparatus may perform information exchange through wireless communication by using near field communication technology such as Bluetooth (registered trademark).

As for the functions implemented by the management server 10, the store terminal 100, the deposit receiving apparatus 200, the settlement apparatus 300, and the mobile terminal 400 described in the present embodiment, these functions are not necessarily implemented by the apparatuses of the present embodiment, and may be implemented by other apparatuses. For example, from when a coupon is reserved with the mobile terminal 400 to when the coupon is used, management of data regarding this coupon may be performed inside the mobile terminal 400. Meanwhile, for example, determination as to whether the depositing process, which has been performed with the deposit receiving apparatus 200 to acquire a reserved coupon, satisfies a depositing content set as an issuance condition for the reserved coupon, may be performed by the deposit receiving apparatus 200.

For example, data regarding the reserved coupon is managed inside the mobile terminal 400 possessed by the customer. When the customer performs the depositing process with the deposit receiving apparatus 200, the deposit receiving apparatus 200 receives, from the mobile terminal 400, the depositing content set as the issuance condition for the reserved coupon. The deposit receiving apparatus 200 determines whether or not the depositing process performed to acquire the reserved coupon satisfies the issuance condition for the reserved coupon. That is, the control unit 210 of the deposit receiving apparatus 200 functions as a determination unit for determining whether or not the depositing process performed to establish the reserved transaction satisfies the depositing content set as a condition for transaction establishment. After the determination result is transmitted to the management server 10, the other processes can be realized as described above. Furthermore, for example, the determination result may be managed in the store terminal 100. In this case, when settlement is performed by the settlement apparatus 300 in the store 3, the store terminal 100 and the settlement apparatus 300 can mutually confirm that the reserved coupon managed by the mobile terminal 400 of the customer has already been issued, and confirm the content of a benefit offered by this coupon. Then, the settlement apparatus 300 can execute the settlement upon receiving, from the mobile terminal 400, information of the content of a benefit offered by the issued coupon.

In the present embodiment, the deposit receiving apparatus 200 determines whether or not the depositing process performed with the deposit receiving apparatus 200 to acquire a coupon satisfies the issuance condition for a reserved coupon. However, the depositing process may be performed without using the deposit receiving apparatus 200. For example, the clerk in the store 3 may recognize and count money brought by the customer to perform the determination. In this case, for example, the above-described processes can be realized when the determination result is inputted to the store terminal 100 and transmitted to the management server 10.

The present embodiment includes examples in which the amount of money deposited by the customer is changed in denomination and dispensed by cash, and the amount of the deposited money is changed to a cash voucher. However, a coupon equivalent to the amount of the deposited money may be issued. In this case, the coupon equivalent to the amount of the deposited money may be issued after the depositing process has been completed and confirmed to satisfy the depositing content set as the issuance condition for the reserved coupon. Alternatively, the coupon equivalent to the amount of the deposited money may be issued when the depositing process is started. The management server 10 may manage the coupon, and determine whether or not the depositing content is satisfied after the depositing process. The management server 10 can make the issued coupon invalid according to the determination result after the coupon has been issued. When the coupon is issued after the depositing process has been confirmed to satisfy the coupon issuance condition, the deposit receiving apparatus 200 may be provided with a coupon issuance unit including a printer, and the coupon issuance unit may print the coupon equivalent to the amount of the deposited money on paper to issue the coupon. Likewise, even when the management server 10 issues the reserved coupon, the coupon printed on paper may be issued by the coupon issuance unit.

In the present embodiment, the clerk creates a coupon while designating a commodity, and the content of a benefit such as a cash rebate or a percent discount. However, the coupon creation method is not limited thereto. For example, after the management server 10 has received the content of a coupon designated by the clerk, the transaction content creation unit 21 may automatically change the content of the benefit designated by the clerk, based on the day of the week, date, time, time period, and information such as weather obtained on the internet 2. Specifically, for example, the transaction content creation unit 21 may be set so as to, when the benefit designated by the clerk is 10% discount on a commodity, automatically change the discount rate to 12% during the morning, and to 9% during nighttime after a predetermined time. Alternatively, for example, the transaction content creation unit 21 may be set so as to adopt the discount rate designated by the clerk when the weather is good, and to automatically change the discount rate when it rains.

As described above, in the transaction management system 1 according to the present embodiment, a transaction that offers a benefit such as a coupon is set and released to provide customers with an incentive to perform a depositing process in the store 3. Depositing of money required in the store 3 can be requested while designating, as a coupon issuance condition, a depositing content including a denomination, quantity, etc., of money. In addition, only depositing of money required in the store 3 can be requested by setting an upper limit to the number of coupons. Moreover, a countermeasure such as creating another coupon may be taken according to the coupon issuance status by setting a time limit for accepting reservations of the coupon. Thus, a shortage of money in the store 3 can be avoided by managing the contents and numbers of transactions performed for the purpose of replenishment of money.

INDUSTRIAL APPLICABILITY

As described above, the transaction management system and the transaction management method according to the present invention are useful in managing transactions that are performed to resolve a shortage of money in money handling apparatuses.

DESCRIPTION OF THE REFERENCE CHARACTERS

1 Transaction management system
2 The internet (network)
3 Store
10 Management server
20, 110, 210, 310, 410 Control unit
21 Transaction content creation unit
22 Message releasing unit
23 Transaction management unit
30, 130, 250, 350, 430 Memory
40, 140, 260, 360, 440 Communication unit
100 Store terminal
120, 220, 320, 420 Operation/display unit
200 Deposit receiving apparatus
230, 330 Depositing unit
240, 340 Dispensing unit
270 Reservation information reader
300 Settlement apparatus
370 Coupon information reader
400 Mobile terminal

The invention claimed is:
1. A transaction management system, comprising:
a money handling apparatus located at a store, wherein the money handling apparatus is configured to recognize, count, and store money; and
a management server including a memory configured to store and manage information on a transaction and a benefit, wherein the management server is configured to
create transaction content including a transaction of depositing money and content of the benefit that is issued on condition that the transaction is completed, and automatically change the content of the benefit in response to a predetermined trigger;
release a message on a network, the message including information on a request for the transaction in which depositing of money or money change is to be performed at the money handling apparatus and information on the benefit that is associated with the transaction that is to be given on condition that the transaction is completed;
receive reservations for the transaction that has been reserved via the network, receive information on completion of the transaction via the network, and give the benefit via the network when a reserved transaction has been completed;
control a plurality of benefits and a denomination and quantity of money requested in a transaction associated with each benefit, and
wherein releasing the message on the network includes the management server being configured to display, on a screen of a mobile terminal, the benefit corre- sponding to the denomination and quantity of money requested in the transaction.

2. The transaction management system according to claim 1, wherein the management server is further configured to control a transaction that can be reserved via the network, as a transaction being open for reservations,
when the transaction has been reserved via the network, designate the transaction as a reserved transaction, and
when it is confirmed that the reserved transaction has been completed, based on the information on completion of the transaction received via the network, designate the benefit associated with the reserved transaction as an already-given benefit.

3. The transaction management system according to claim 1, wherein the management server is further configured to set transaction identification information for the reserved transaction in order to manage information on each reserved transaction,
wherein the information on completion of the transaction includes the transaction identification information.

4. The transaction management system according to claim 3, wherein the management server encodes the transaction identification information into an optical code to transmit via the network.

5. The transaction management system according to claim 1, wherein
the message includes information on designation of a denomination and quantity of money requested in the transaction, and
an upper limit is set for an acceptable number of reservations for the transaction.

6. The transaction management system according to claim 1, wherein a time limit within which reservations for the transaction are acceptable is set.

7. The transaction management system according to claim 6, wherein the management server controls the time limit, and releases the message including information that the time limit is close, at a predetermined timing before the time limit.

8. The transaction management system according to claim 1, wherein a time limit within which the benefit is usable is set.

9. The transaction management system according to claim 1, wherein the management server is further configured to
release the message to be displayed on the mobile terminal, and
receive a reservation from the mobile terminal.

10. The transaction management system according to claim 9, wherein
the benefit is set to be used in a specific store, and
the management server manages benefits of a plurality of different stores, companies to which the respective stores belong, and categories into which the respective companies are classified,
in response to an operation to select a category being performed on the mobile terminal, the management server displays the companies classified into the selected category on a screen of the mobile terminal,
in response to an operation to select a company being performed on the mobile terminal, the management server displays the stores that belong to the selected company on the screen of the mobile terminal, and
in response to an operation to select a store being performed on the mobile terminal, the management server displays a benefit of the selected store on the screen of the mobile terminal.

11. The transaction management system according to claim 10, wherein
the management server manages benefits of a plurality of different stores, and location information indicating locations of the respective stores,
in response to an operation to display a map being performed on the mobile terminal, the management server displays the locations of the stores on the map, and
in response to an operation to select a store on the map being performed on the mobile terminal, the management server displays the benefit of the selected store.

12. The transaction management system according to claim 11, wherein
in response to an operation to select conditions of a denomination and quantity of money is performed on the mobile terminal, the management server displays only the location of a store, for which the denomination and quantity of money requested in the transaction satisfy the selected conditions, on the map among the plurality of stores that have been displayed on the map.

13. The transaction management system according to claim 9, wherein
the management server transmits, to the mobile terminal, benefit identification information set on the benefit to be given, and
upon receiving the benefit identification information from a settlement apparatus for using the benefit, the management server transmits information on the benefit to the settlement apparatus.

14. The transaction management system according to claim 1, wherein
receive, via the network, information on the deposited money from the money handling apparatus on completion of the transaction.

15. A transaction management method, the method comprising:
creating transaction content including a transaction of depositing money and content of a benefit that is issued on condition that the transaction is completed, and automatically changing the content of the benefit in response to a predetermined trigger;
releasing a message on a network by a management server, the message including information on a request for the transaction in which depositing of money or money change is to be performed at a money handling apparatus and information on a benefit that is associated with the transaction that is to be given on condition that the transaction is completed;
accepting, via the network, reservations for the transaction released by the management server;
controlling, by the management server, the transaction that has been reserved as a reserved transaction;
receiving, at the management server, information on completion of the transaction via the network, and giving, by the management server, the benefit via the network when the reserved transaction has been completed,
controlling, at the management server, a plurality of benefits and a denomination and quantity of money requested in a transaction associated with each benefit, and
wherein releasing the message on the network includes the method further comprising displaying, by the management server, on a screen of the mobile terminal, the benefit corresponding to the denomination and quantity of money requested in the transaction.

* * * * *